United States Patent
Jamison

(10) Patent No.: US 11,271,886 B2
(45) Date of Patent: Mar. 8, 2022

(54) METHOD, APPARATUS, AND COMPUTER PROGRAM PRODUCT FOR GROUP-BASED COMMUNICATION INTERFACE WITH EMAIL, CHANNELING

(71) Applicant: Slack Technologies, Inc., San Francisco, CA (US)

(72) Inventor: Britton Jamison, San Francisco, CA (US)

(73) Assignee: Slack Technologies, LLC, San Francisco, CA (US)

(*) Notice: Subject to any disclaimer, the term of this patent is extended or adjusted under 35 U.S.C. 154(b) by 0 days.

(21) Appl. No.: 16/666,837

(22) Filed: Oct. 29, 2019

(65) Prior Publication Data

US 2020/0137018 A1  Apr. 30, 2020

Related U.S. Application Data

(60) Provisional application No. 62/753,200, filed on Oct. 31, 2018.

(51) Int. Cl.
*H04L 12/58* (2006.01)
*H04L 51/48* (2022.01)
*H04L 51/046* (2022.01)
*H04L 51/00* (2022.01)

(52) U.S. Cl.
CPC ............ *H04L 51/28* (2013.01); *H04L 51/046* (2013.01); *H04L 51/16* (2013.01)

(58) Field of Classification Search
CPC ....... H04L 51/28; H04L 51/046; H04L 51/16; G06Q 10/107

USPC ........................................................ 709/206
See application file for complete search history.

(56) References Cited

U.S. PATENT DOCUMENTS

| 7,130,885 B2 | 10/2006 | Chandra et al. |
| 2011/0137991 A1 | 6/2011 | Russell |
| 2012/0278381 A1 | 11/2012 | Ferlitsch et al. |
| 2013/0018960 A1* | 1/2013 | Knysz .................. H04L 65/403 709/204 |

(Continued)

OTHER PUBLICATIONS

International Search Report and Written Opinion for Application No. PCT/US2019/058442 dated Oct. 29, 2019.

(Continued)

*Primary Examiner* — David R Lazaro
*Assistant Examiner* — Zia Khurshid
(74) *Attorney, Agent, or Firm* — Erise IP, P.A.

(57) ABSTRACT

Methods, systems, apparatuses, and computer program products are provided for executing an email communication import protocol in a selected group-based communication interface within a group-based communication system. The group-based communication system allows for receiving one or more email communication corpus associated with email communication accounts and parsing the email communication corpus to identify email communication account identifiers. The group-based communication system thereafter creates and transmits group-based communication interface invitations to the email communication accounts to allow access to the group-based communication interface. Upon access to the group-based communication interface, content from the email communication corpus may be included in the group-based communication interface.

33 Claims, 21 Drawing Sheets

(56) References Cited

U.S. PATENT DOCUMENTS

| | | | | |
|---|---|---|---|---|
| 2015/0019659 | A1* | 1/2015 | Eidelson | H04L 51/32 709/206 |
| 2016/0234302 | A1* | 8/2016 | Wu | H04L 67/06 |
| 2016/0344679 | A1 | 11/2016 | Lane et al. | |
| 2017/0272388 | A1 | 9/2017 | Bern et al. | |
| 2018/0197144 | A1 | 7/2018 | Frank et al. | |
| 2018/0287982 | A1 | 10/2018 | Draeger et al. | |
| 2019/0253849 | A1 | 8/2019 | Ryder et al. | |

OTHER PUBLICATIONS

"Die, Email, Die! A Flickr Cofounder Aims To Cut US All Some Slack", Readwriteweb, Lexisnexis, https://advance.lexis.com/api/pemnalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/pemnalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

EP Application No. 19805829.9 European Examination Report dated Sep. 28, 2021.

* cited by examiner

1600

1601 → RECEIVE A GROUP-BASED COMMUNICATION INTERFACE REQUEST

1602 → GENERATE AND DISPLAY A GROUP-BASED COMMUNICATION INTERFACE INDENTIFIER

1702 → GENERATE AND DISPLAY A GROUP-BASED COMMUNICATION CHANNEL IDENTIFIER

1704 → TRANSLATE THE CONTENT OF THE THIRD PARTY EMAIL COMMUNICATION INTO A GROUP-BASED COMMUNICATION CHANNEL IDENTIFIER BASED ON ESTABLISHED CONVENTIONS OF THE GROUP-BASED COMMUNICATON INTERFACE

1901 → GENERATE A THIRD PARTY EMAIL COMMUNICATION

1902 → TRANSMIT THE THIRD PARTY EMAIL COMMUNICATION TO A GROUP-BASED COMMUNICATION SYSTEM

1903 → RECEIVE A GROUP-BASED COMMUNICATION INTERFACE INVITATION REQUEST

1904 → TRANSMIT AN APPROVAL OF THE GROUP-BASED COMMUNICATION INTERFACE INVITATION

2001 → GENERATE A GROUP-BASED COMMUNICATION INTERFACE REQUEST

2002 → RECEIVE A GROUP-BASED COMMUNICATION INTERFACE IDENTIFIER

2101 → RECEIVE A REQUEST TO ACCESS THE THIRD PARTY EMAIL COMMUNICATION ACCOUNT

2102 → TRANSMIT AN APPROVAL TO ACCESS THE THIRD PARTY EMAIL COMMUNICATION ACCOUNT

2103 → TRANSMIT A PLURALITY OF THIRD PARTY EMAIL COMMUNICATIONS CORPUS OF THE THIRD PARTY EMAIL COMMUNICATION ACCOUNT

FIG. 21

METHOD, APPARATUS, AND COMPUTER PROGRAM PRODUCT FOR GROUP-BASED COMMUNICATION INTERFACE WITH EMAIL, CHANNELING

CROSS-REFERENCE TO RELATED APPLICATIONS

This application claims the benefit of U.S. Provisional Patent Application No. 62/753,200, filed Oct. 31, 2018, the entire contents of which are incorporated by reference herein.

BACKGROUND

Various messaging systems are available that allow users to have continuous conversations electronically between each other. In such systems, one or more users may send messages back and forth discussing various topics. Applicant has identified a number of deficiencies and problems associated with handling messages across these various messaging systems. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for an apparatus configured to execute an email communication import protocol in a selected group-based communication interface. The apparatus comprises at least a processor, and a memory associated with the processor having computer coded instructions therein, with the computer coded instructions configured to, when executed by the processor, cause the apparatus to receive a third party email communication corpus, the third party email communication corpus comprising one or more third party email communication account identifiers, each of the one or more third party email communication account identifiers being associated with respective third party email communication accounts external to the group-based communication interface; parse the third party email communication corpus to identify the one or more third party email communication account identifiers; and generate and transmit a group-based communication interface invitation to the third party email communication account associated with the at least one of the one or more third party email communication account identifiers. The group-based communication interface invitation comprises a user engageable link to access the group-based communication interface.

In some embodiments, the computer coded instructions may be configured to, when executed by the processor, further cause the apparatus to receive a group-based communication interface request and in response to receiving a group-based communication interface request, generate and display a group-based communication interface identifier, wherein receipt of the group-based communication interface request occurs prior to or in response to receipt and analysis of the third party email communication corpus. In some embodiments, the third party email communication corpus may include a group-based communication interface identifier.

In some embodiments, the user engageable link may be configured to allow access to a group-based communication channel of the group-based communication interface. In some embodiments, the group-based communication channel of the group-based communication interface includes a messaging communication derived from content of the third party email communication corpus.

In some embodiments, the computer coded instructions may be configured to, when executed by the processor, further cause the apparatus to generate and display a group-based communication channel identifier based on a content of the third party email communication corpus prior to or in response to receipt or analysis of the third party email communication corpus.

In some embodiments, the content of the third party email communication corpus may include a subject line of the third party email communication corpus, a body of the third party email communication corpus, one or more third party email communication account identifiers associated with the third party email communication corpus, or a combination thereof.

In some embodiments, generating the group-based communication channel identifier may include translating the content of the third party email communication corpus into a group-based communication channel identifier based on established conventions of the group-based communication interface. In some embodiments, the computer coded instructions may be configured to, when executed by the processor, compare the one or more third party email communication account identifiers to a set of third party email communication account identifiers associated with the group-based communication interface when analyzing the third party email communication corpus including the one or more third party email communication account identifiers. In some embodiments, the computer coded instructions may be configured to, when executed by the processor, further cause the apparatus to copy at least one of the one or more email communication account identifiers. In some embodiment, the computer coded instructions may be configured to, when executed by the processor, copy the one or more third party email communication account identifiers not listed in the set of third party email communication account identifiers associated with the group-based communication interface when copying at least one of the one or more third party email communication account identifiers. In some embodiments, the computer coded instructions may be configured to, when executed by the processor, further cause the apparatus to store the one or more third party email communication account identifiers in a set of third party email communication account identifiers associated with the group-based communication interface. In some embodiments, the computer coded instructions may be configured to, when executed by the processor, further cause the apparatus to transmit a request to access the third party email communication account, receive an approval to access the third party email communication account, and in response to receiving the approval to access the third party email communication account, receive the third party email communication corpus. In some embodiments, when the apparatus receives the third party email communication corpus, the respective third party email communication accounts external to the group-based communication interface may also be in receipt of the third party email communication corpus.

Embodiments provided herein are also directed to a method to execute an email communication import protocol in a selected group-based communication interface, the specified group-based communication interface organizing a collection of messaging communications into a plurality of group-based communication channels, the method may include receiving a third party email communication corpus, the third party email communication corpus comprising one or more third party email communication account identifiers, each of the one or more third party email communication account identifiers being associated with respective third party email communication accounts external to the group-based communication interface, parsing the third party email communication corpus to identify the one or more third party email communication account identifiers, and generating and transmitting a group-based communication interface invitation to the third party email communication account associated with the at least one of the one or more third party email communication account identifiers. The group-based communication interface invitation may include a user engageable link to access the group-based communication interface.

In some embodiments, the method may include receiving a group-based communication interface request and in response to receiving a group-based communication interface request, generating and displaying a group-based communication interface identifier, wherein receipt of the group-based communication interface request occurs prior to or in response to receipt and analysis of the third party email communication corpus.

In some embodiments, the third party email communication corpus includes a group-based communication interface identifier. In some embodiments, the user engageable link may be configured to allow access to a group-based communication channel of the group-based communication interface. In some embodiments, the group-based communication channel of the group-based communication interface may include a messaging communication derived from content of the third party email communication corpus. In some embodiments, the method may include generating and displaying a group-based communication channel identifier based on a content of the third party email communication corpus prior to or in response to receipt or analysis of the third party email communication corpus. In some embodiments, the content of the third party email communication corpus may include a subject line of the third party email communication corpus, a body of the third party email communication corpus, one or more third party email communication account identifiers associated with the third party email communication corpus, or a combination thereof. In some embodiments, generating the group-based communication channel identifier may include translating the content of the third party email communication corpus into a group-based communication channel identifier based on established conventions of the group-based communication interface.

In some embodiments, the method may include comparing the one or more third party email communication account identifiers to a set of third party email communication account identifiers associated with the group-based communication interface when analyzing the third party email communication corpus including the one or more third party email communication account identifiers.

In some embodiments, the method may include copying at least one of the one or more email communication account identifiers. In some embodiments, copying the one or more third party email communication account identifiers not listed in the set of third party email communication account identifiers associated with the group-based communication interface when copying at least one of the one or more third party email communication account identifiers.

In some embodiments, the method may include storing the one or more third party email communication account identifiers in a set of third party email communication account identifiers associated with the group-based communication interface.

In some embodiments, the method may include transmitting a request to access the third party email communication account, receiving an approval to access the third party email communication account, and in response to receiving the approval to access the third party email communication account, receiving the third party email communication corpus. In some embodiments, when the third party email communication corpus is received, the respective third party email communication accounts external to the group-based communication interface may be in receipt of the third party email communication corpus.

Embodiments of the present disclosure are also directed to an apparatus configured to execute an email communication import protocol in a selected group-based communication interface, the apparatus comprising at least a processor, and a memory associated with the processor having computer coded instructions therein, with the computer coded instructions configured to, when executed by the processor, cause the apparatus to generate a third party email communication corpus, the third party email communication corpus comprising one or more third party email communication account identifiers, each of the one or more third party email communication account identifiers being associated with respective third party email communication accounts external to the group-based communication interface, and transmit the third party email communication corpus to a group-based communication system comprising the group-based communication interface, wherein transmission of the third party email communication corpus to the group-based communication system causes a group-based communication interface invitation to be transmitted to at least one third party email communication account associated with at least one of the one or more third party email communication account identifiers of the third party email communication corpus and wherein the group-based communication interface invitation comprises a user engageable link to access the group-based communication interface.

In some embodiments, the computer coded instructions may be configured to, when executed by the processor, further cause the apparatus to generate a group-based communication interface request and in response to generating a group-based communication interface request, receive a group-based communication interface identifier, wherein receipt of the group-based communication interface request occurs prior to or in response to generation of the third party email communication corpus.

In some embodiments, when transmitting the third party email communication corpus to a group-based communication system including the group-based communication interface, the third party email communication corpus includes a group-based communication interface identifier. In some embodiments, the computer coded instructions are configured to, when executed by the processor, further cause the apparatus to receive a group-based communication interface invitation request, and transmit an approval of the group-based communication interface invitation request prior to transmission of the group-based communication interface invitation to be transmitted to at least one third party email communication account associated with at least one of the one or more third party email communication account identifiers of the third party email communication corpus.

In some embodiments, the user engageable link is configured to allow access to a group-based communication channel of the group-based communication interface and wherein the group-based communication channel of the group-based communication interface includes a messaging communication derived from content of the third party email communication corpus.

In some embodiments, the computer coded instructions are configured to, when executed by the processor, further cause the apparatus to generate and display a group-based communication channel identifier based on a content of the third party email communication corpus.

In some embodiments, the content of the third party email communication corpus comprises a subject line of the third party email communication corpus, a body of the third party email communication corpus, one or more third party email communication account identifiers associated with the third party email communication corpus, or a combination thereof. In some embodiments, generating the group-based communication channel identifier includes translating the content of the third party email communication corpus into a group-based communication channel identifier based on established conventions of the group-based communication interface.

In some embodiments, the computer coded instructions are configured to, when executed by the processor, further cause the apparatus to receive a request to access the third party email communication account, transmit an approval to access the third party email communication account, and in response to transmitting the approval to access the third party email communication account, transmitting the third party email communication corpus.

Embodiments are also directed to an apparatus configured to execute an email communication import protocol in a selected group-based communication interface, the apparatus including at least a processor, and a memory associated with the processor having computer coded instructions therein, with the computer coded instructions configured to, when executed by the processor, cause the apparatus to receive a group-based communication interface invitation, the group-based communication interface invitation directed to a third party email communication account associated with a third party email communication account identifier, transmit a group-based communication interface access request to a group-based communication system, and in response to transmitting the group-based communication interface access request, display the group-based communication interface.

In some embodiments, the group-based communication interface invitation may include a user engageable link configured to allow access to a group-based communication channel of the group-based communication interface.

In some embodiments, the group-based communication channel of the group-based communication interface may include a messaging communication derived from content of a third party email communication corpus. In some embodiments, the content of the third party email communication corpus may include a subject line of the third party email communication corpus, a body of the third party email communication corpus, one or more third party email communication account identifiers associated with the third party email communication corpus, or a combination thereof.

In some embodiments, the computer coded instructions are configured to, when executed by the processor, further cause the apparatus to receive a request to access the third party email communication account, transmit an approval to access the third party email communication account, and in response to transmitting the approval to access the third party email communication account, transmit the third party email communication corpus.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
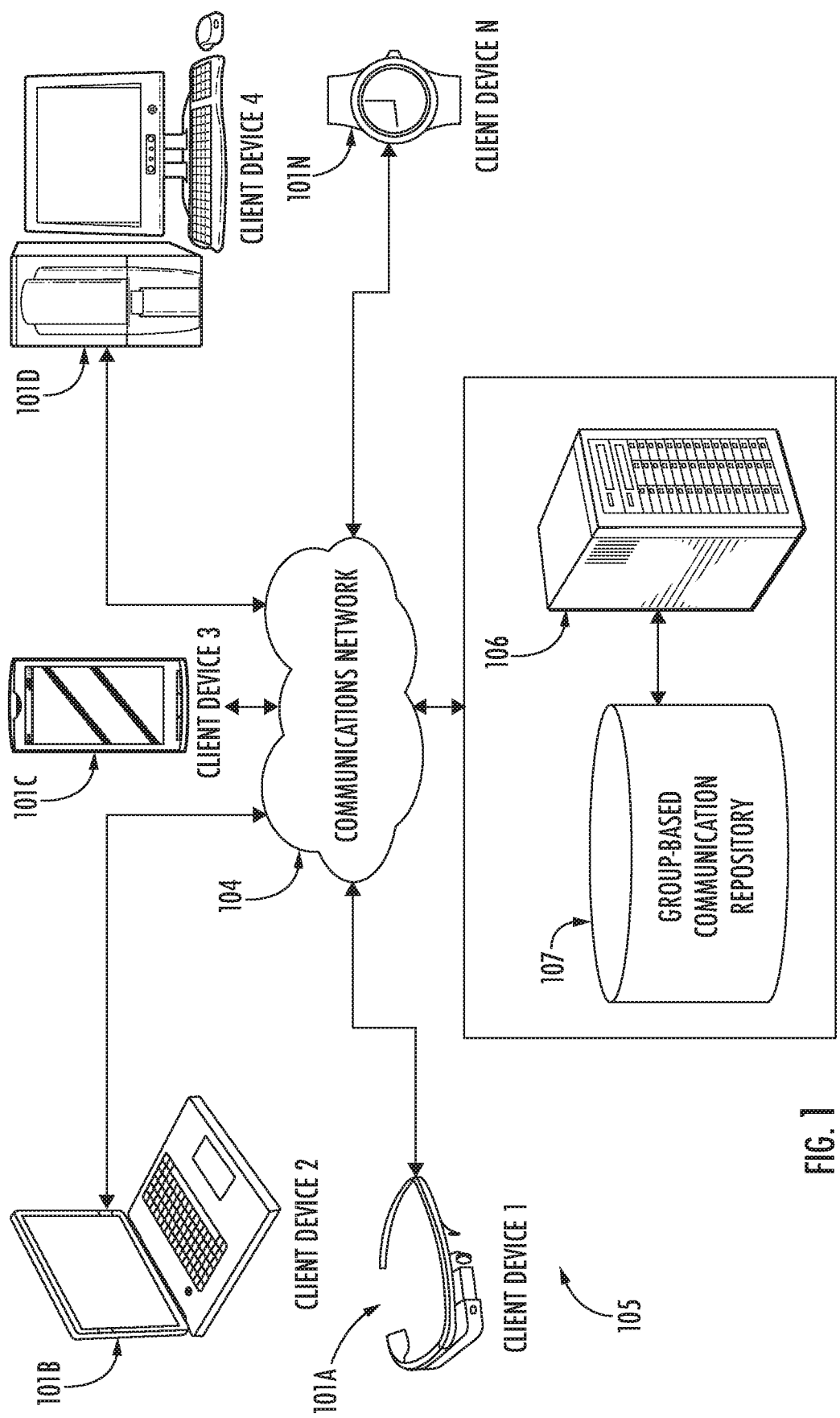
Figure 2:
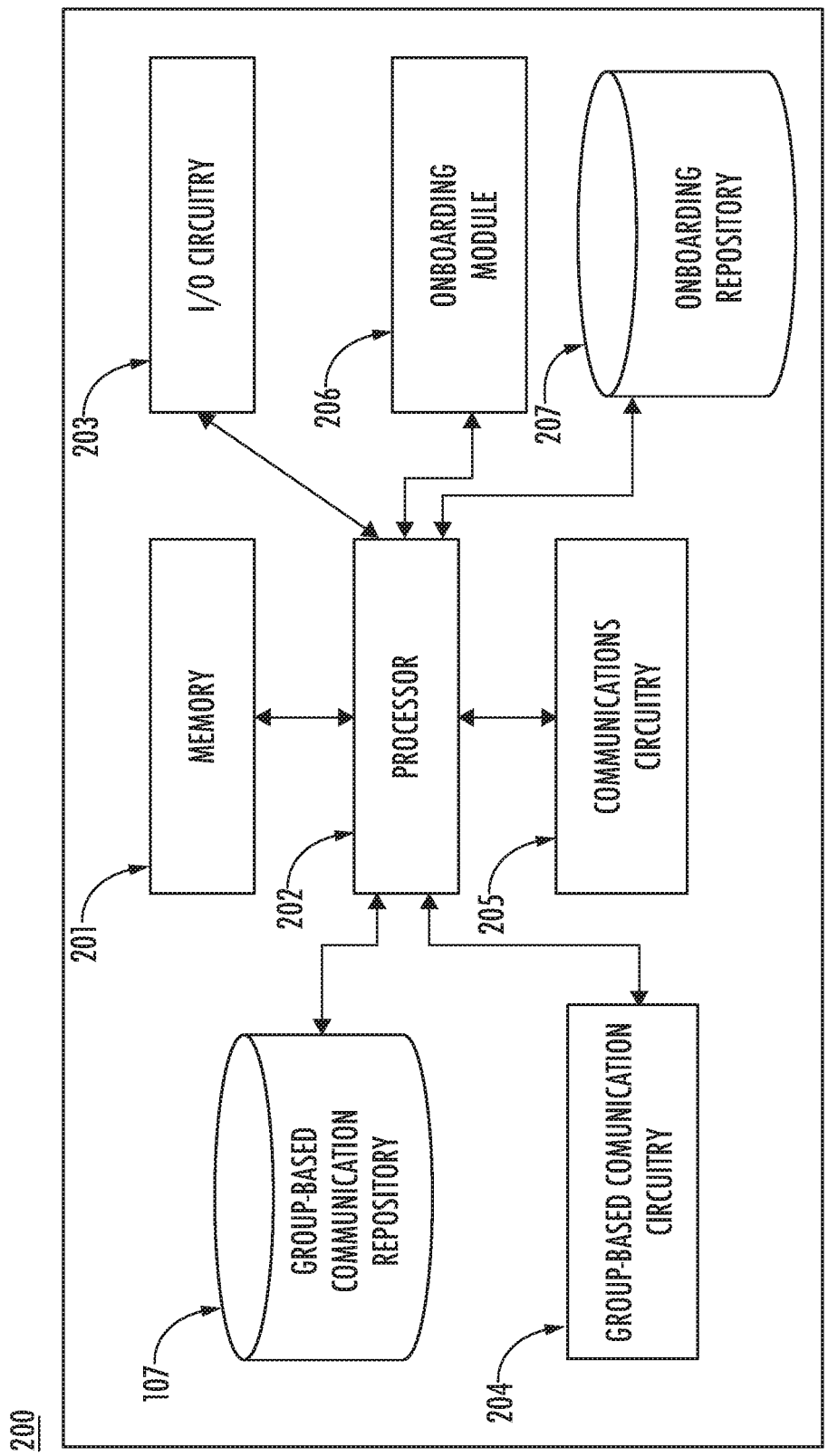
Figure 3A:
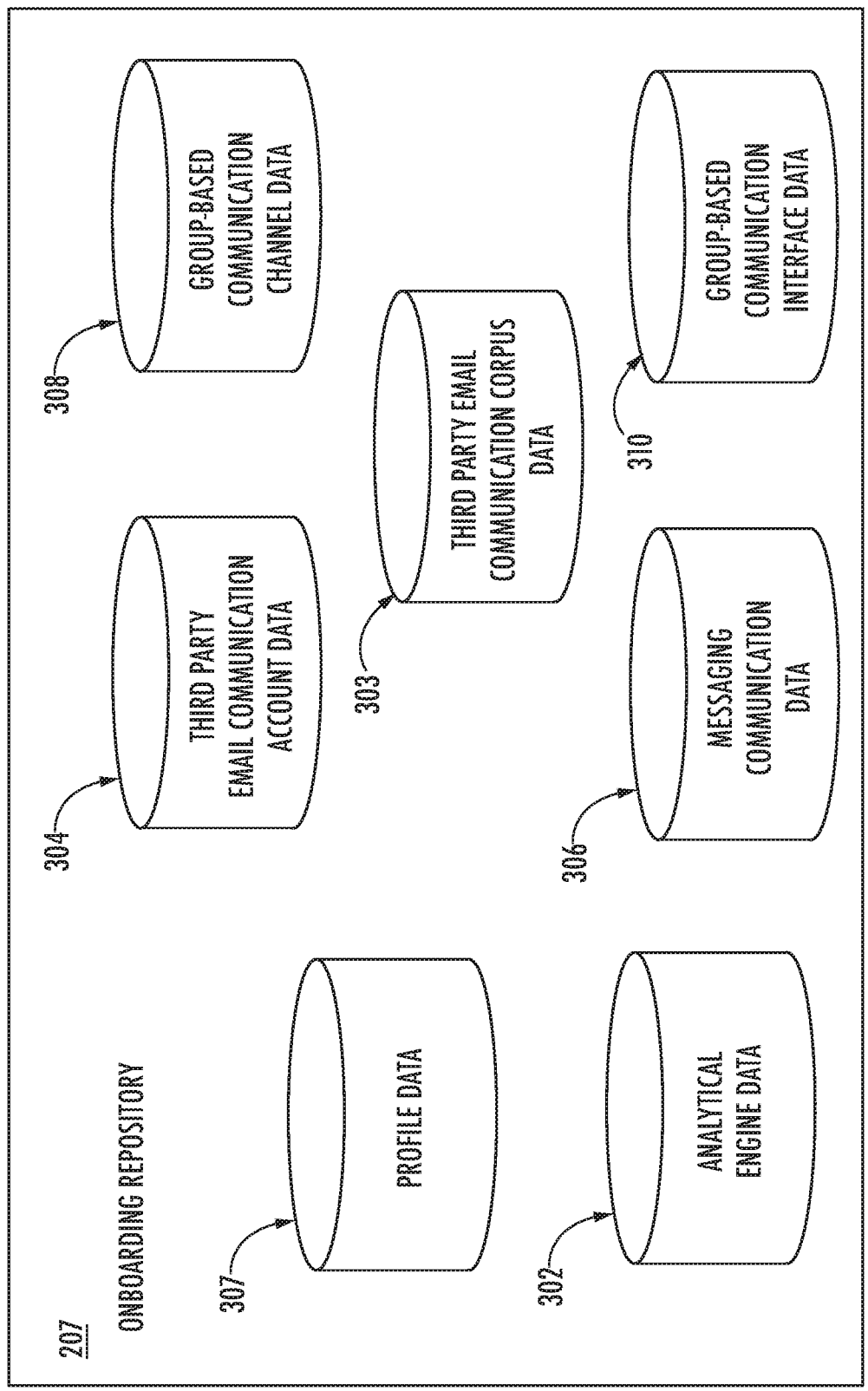
Figure 3B:
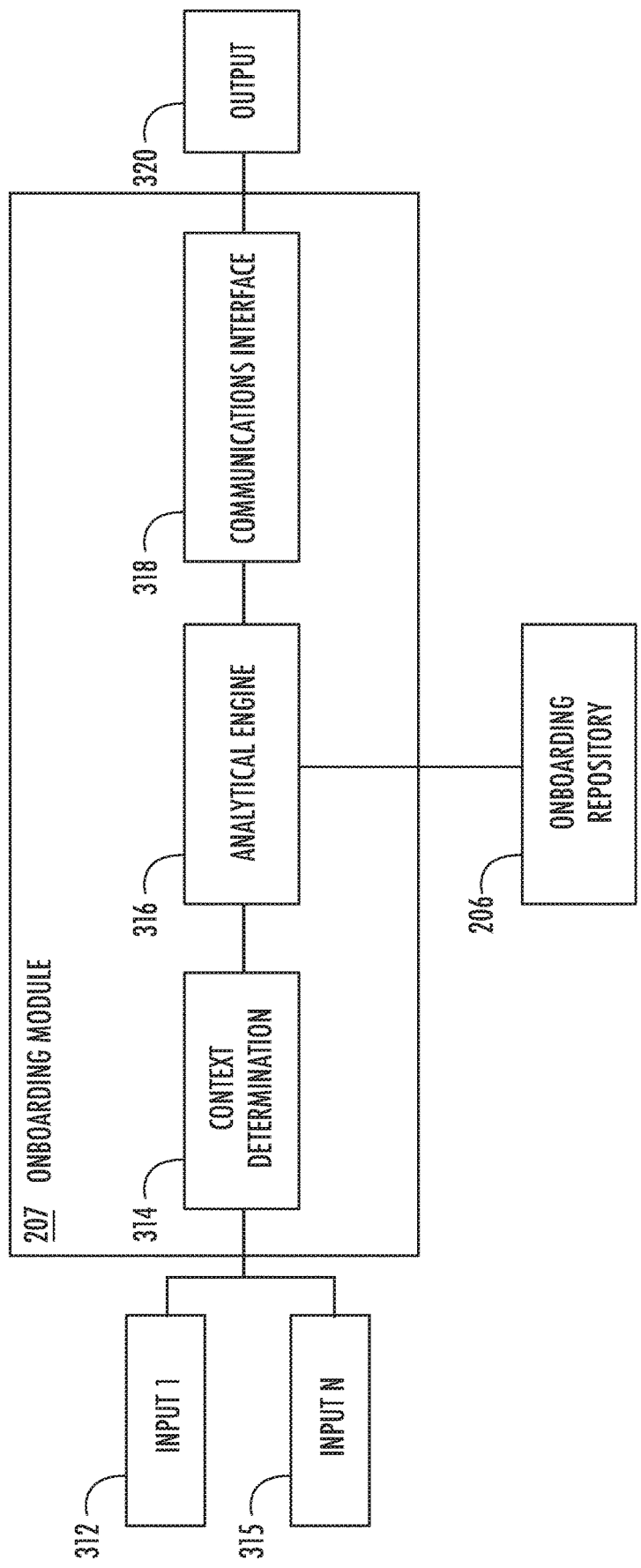
Figure 4:
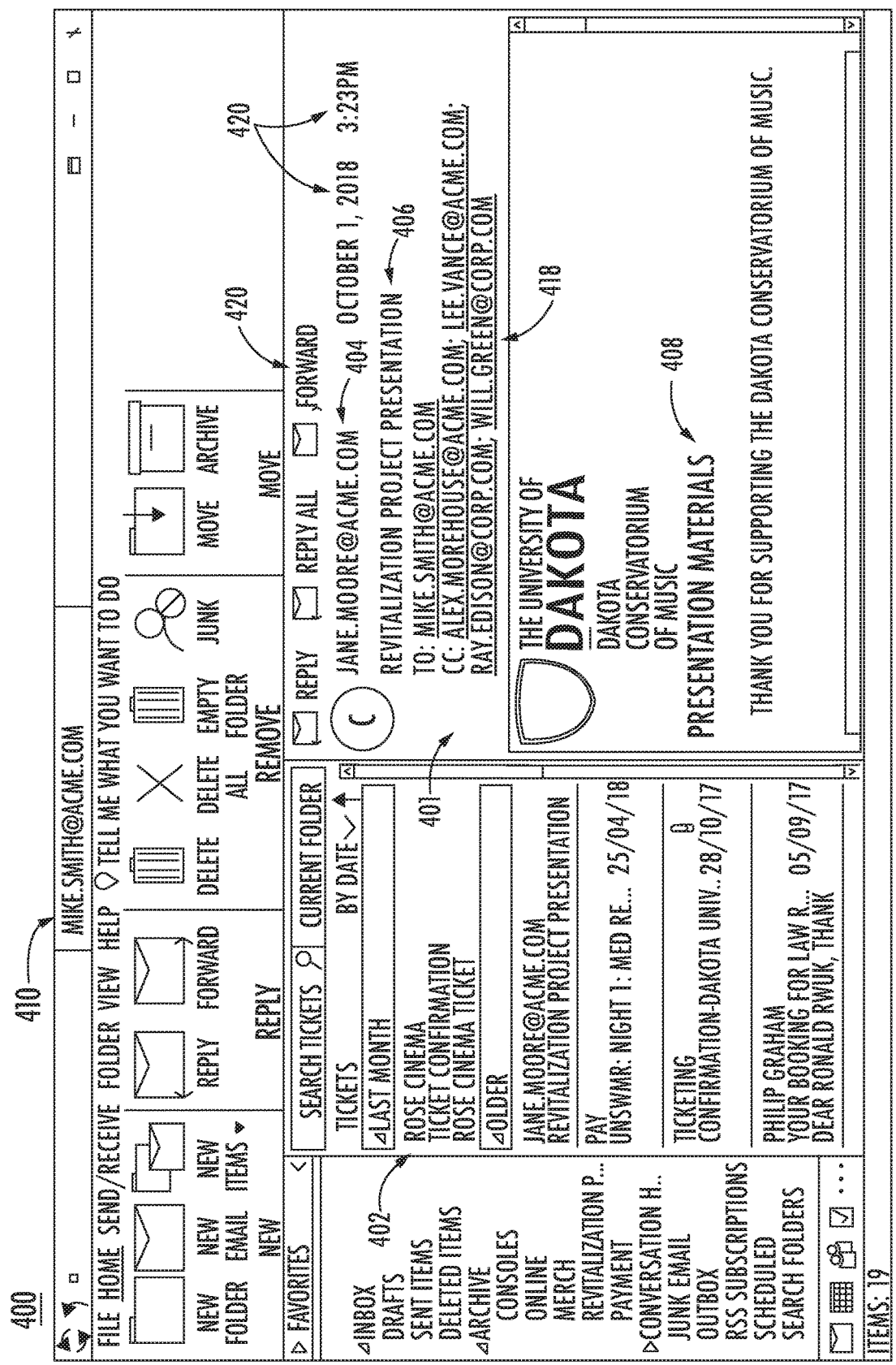
Figure 5:
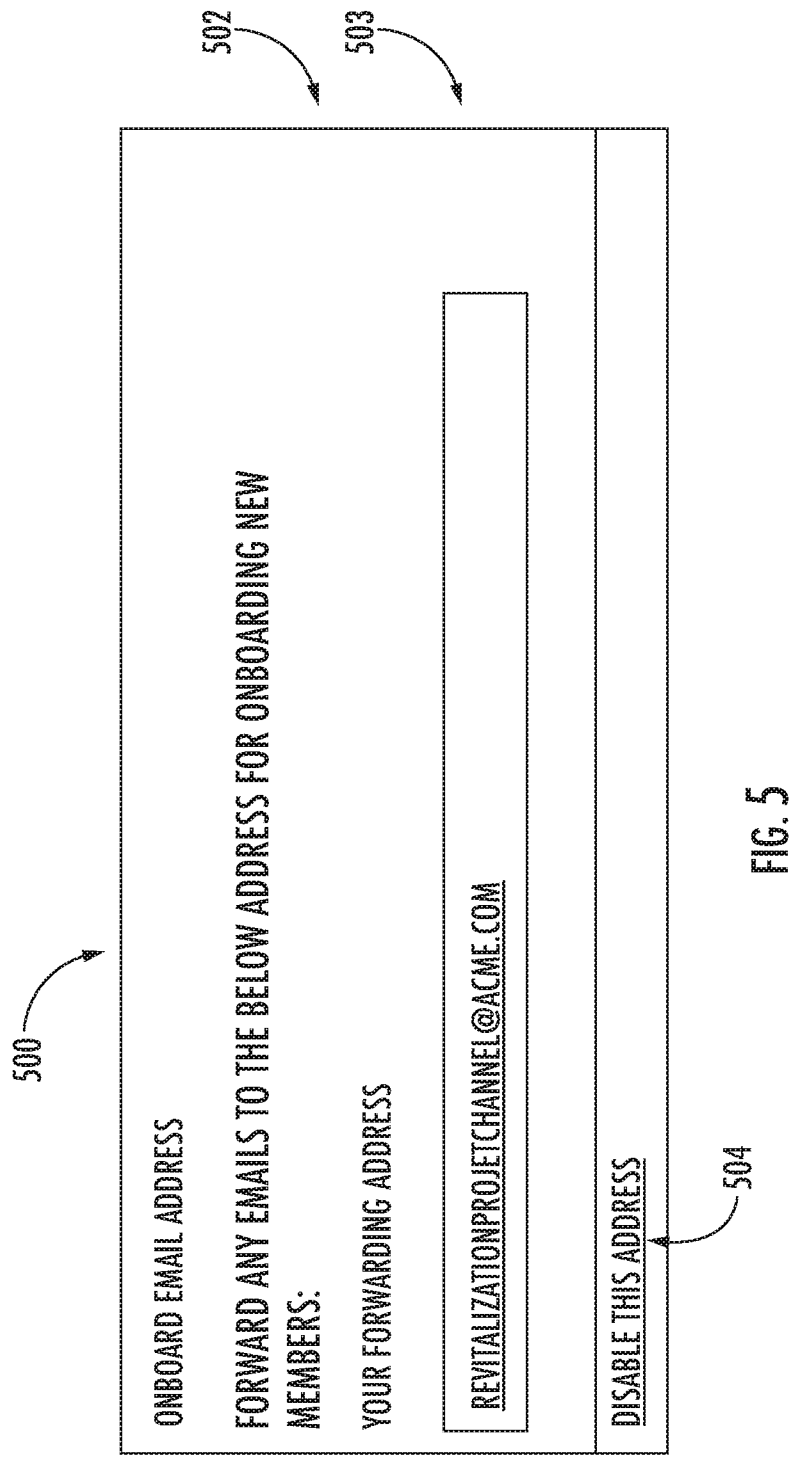
Figure 6:
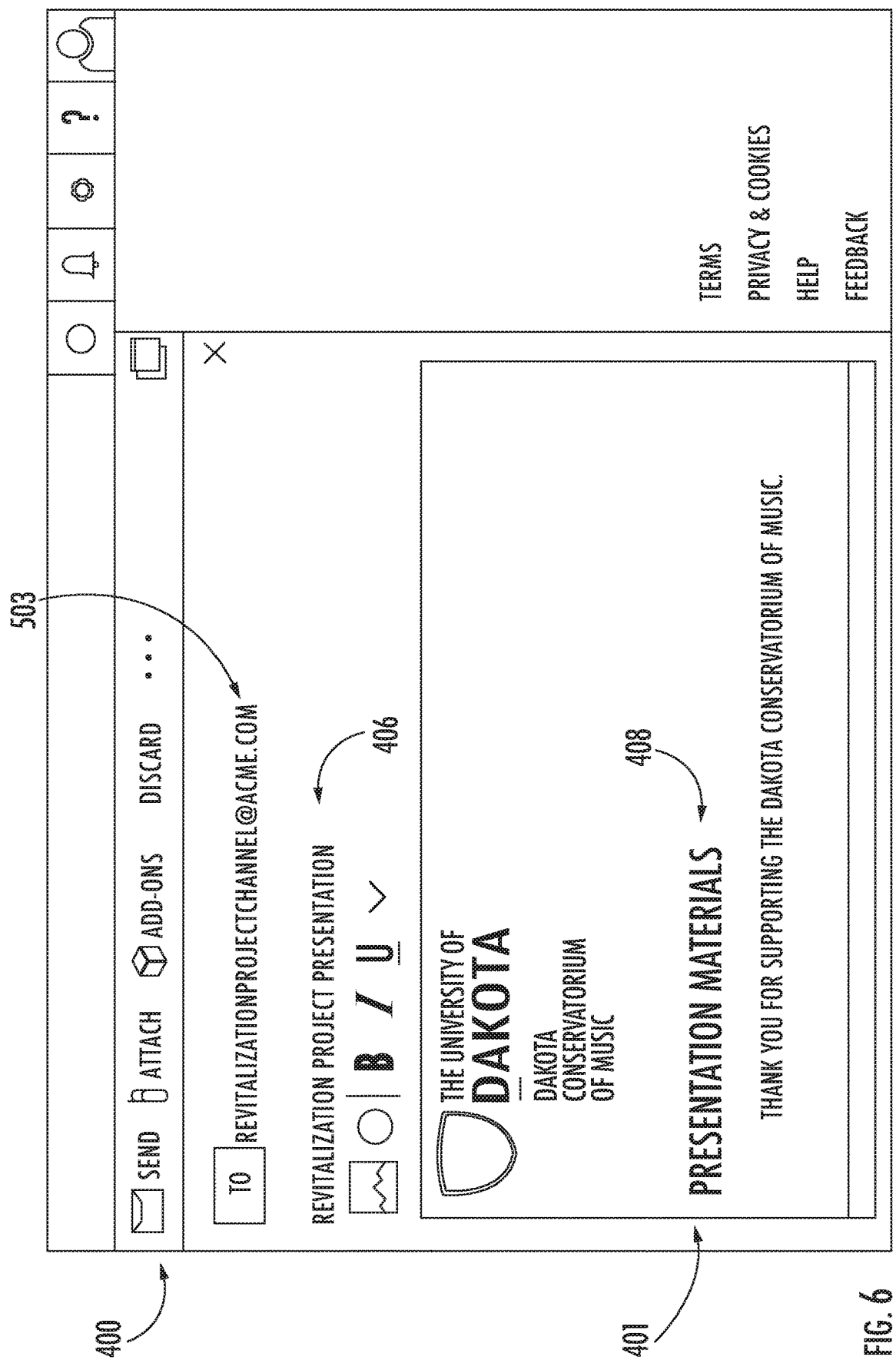
Figure 7:
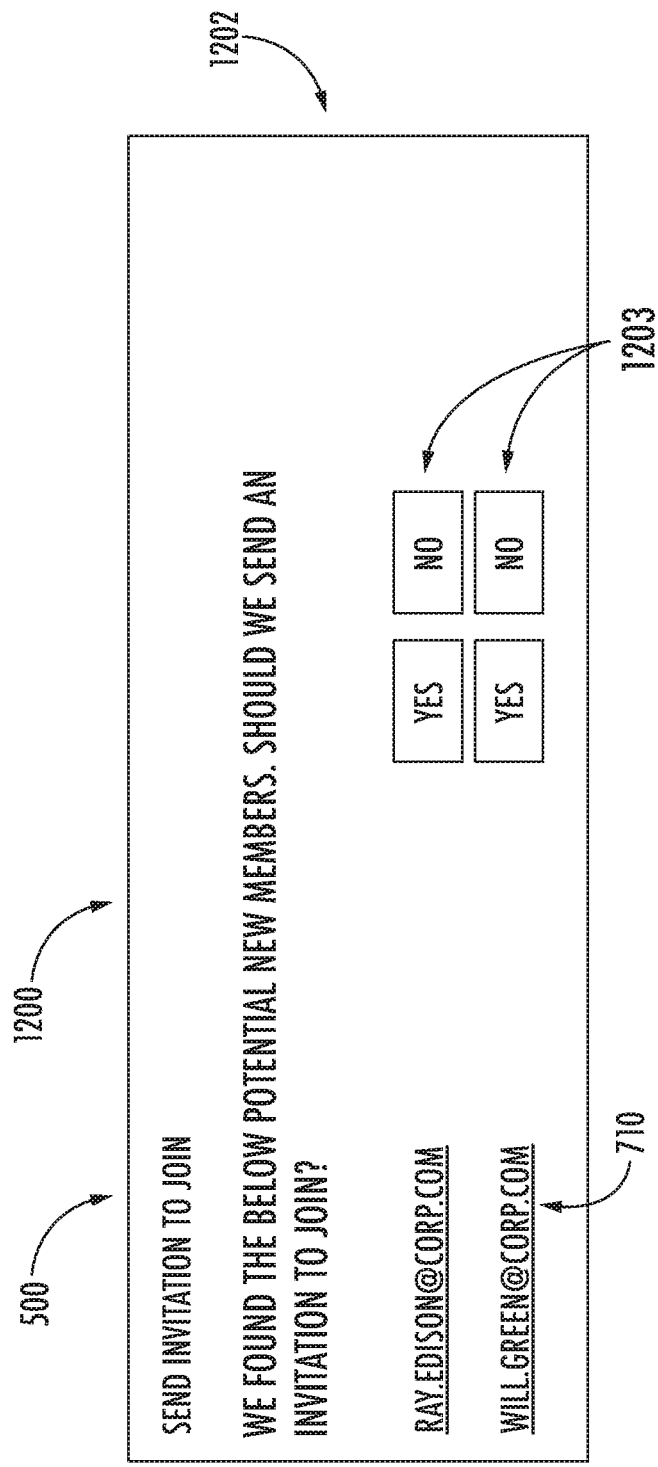
Figure 8:
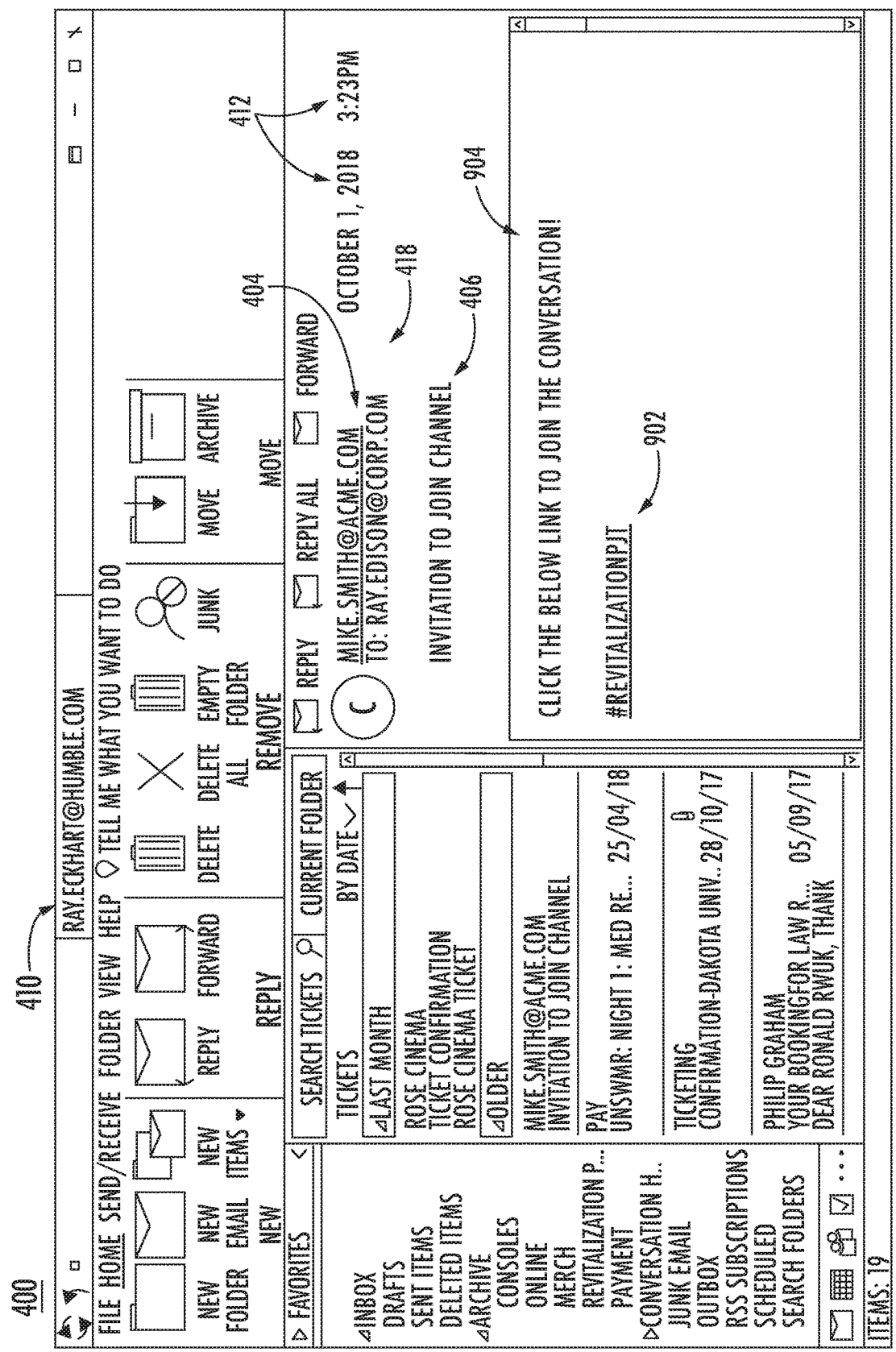
Figure 9:
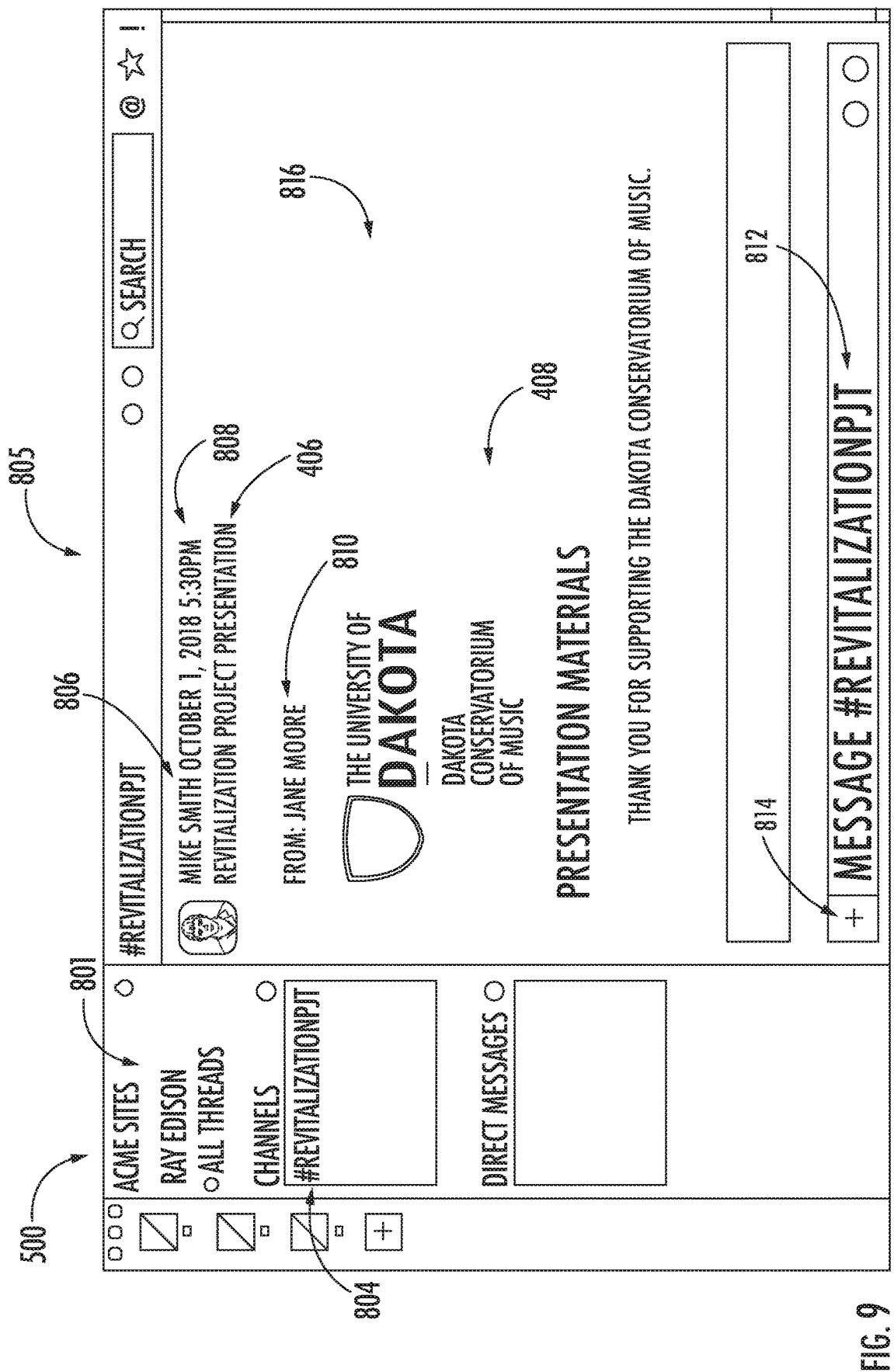
Figure 10:
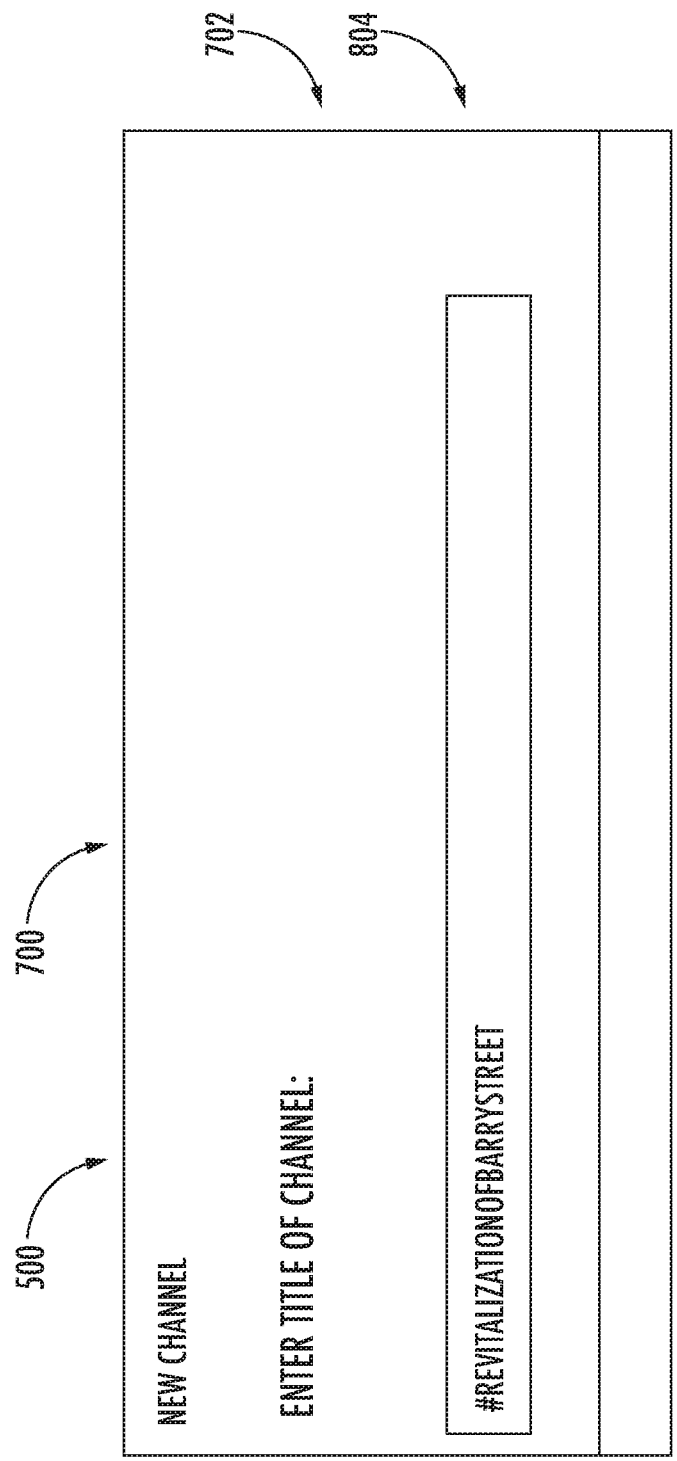
Figure 11:
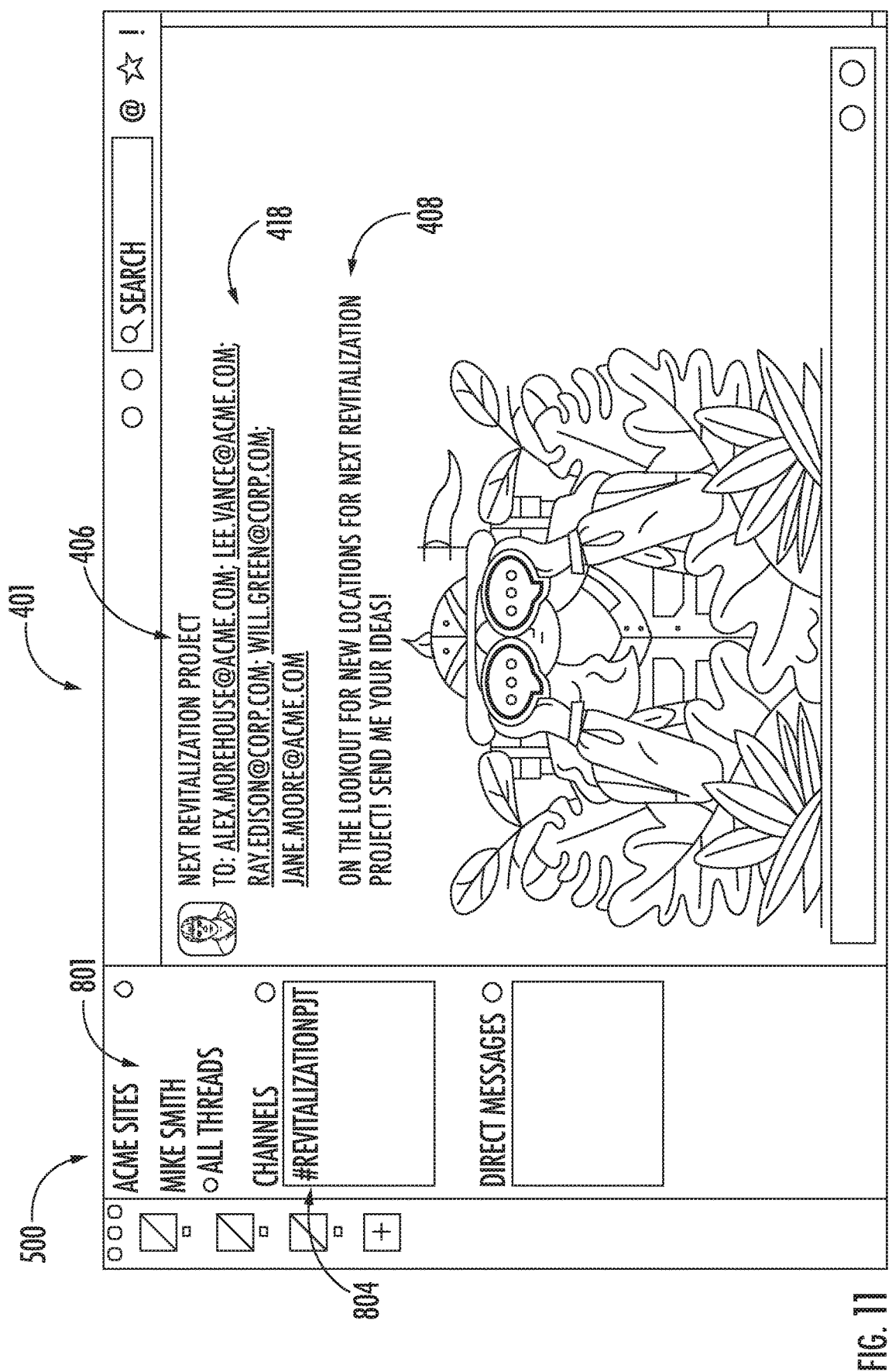
Figure 12:
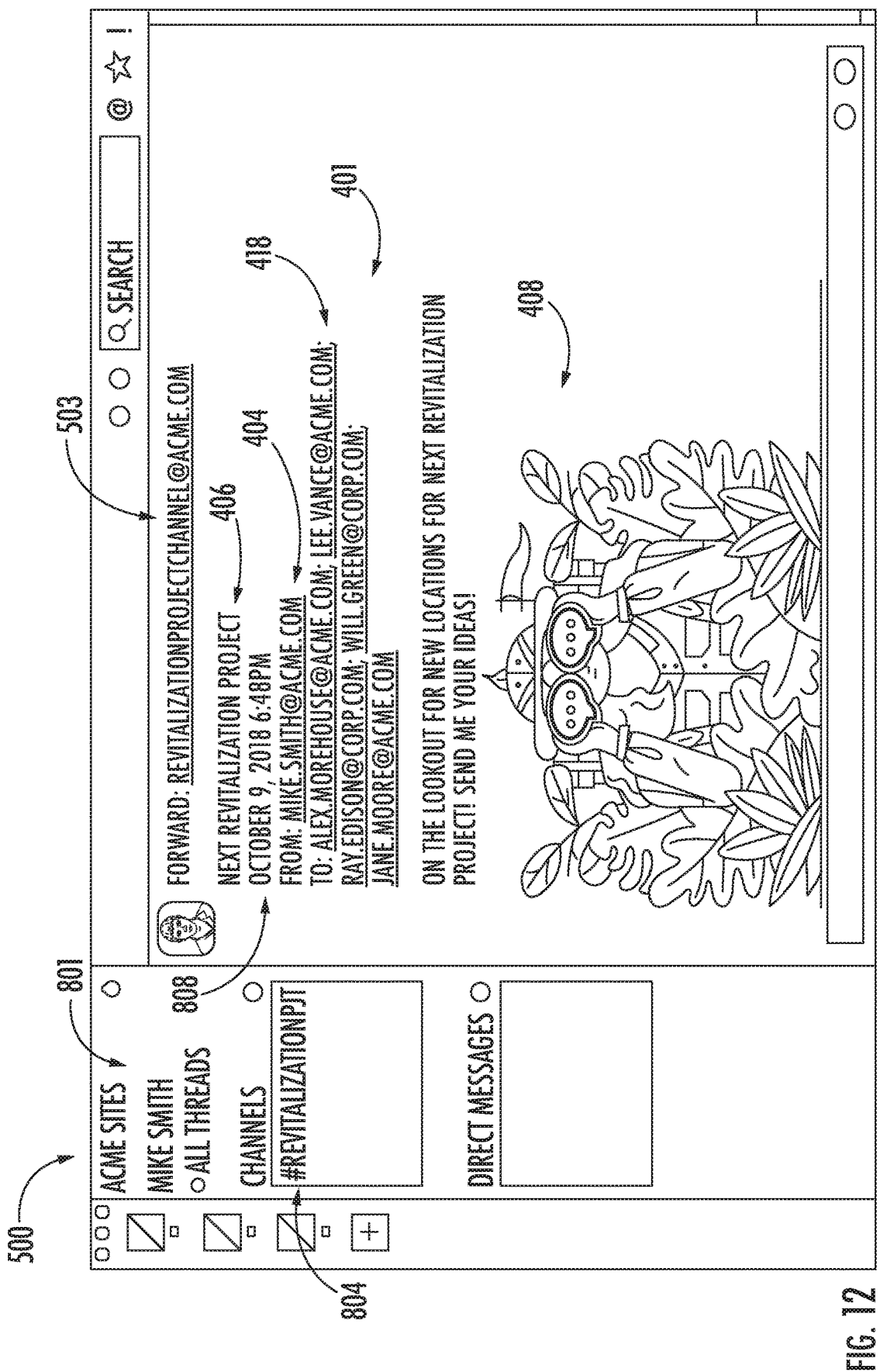
Figure 13:
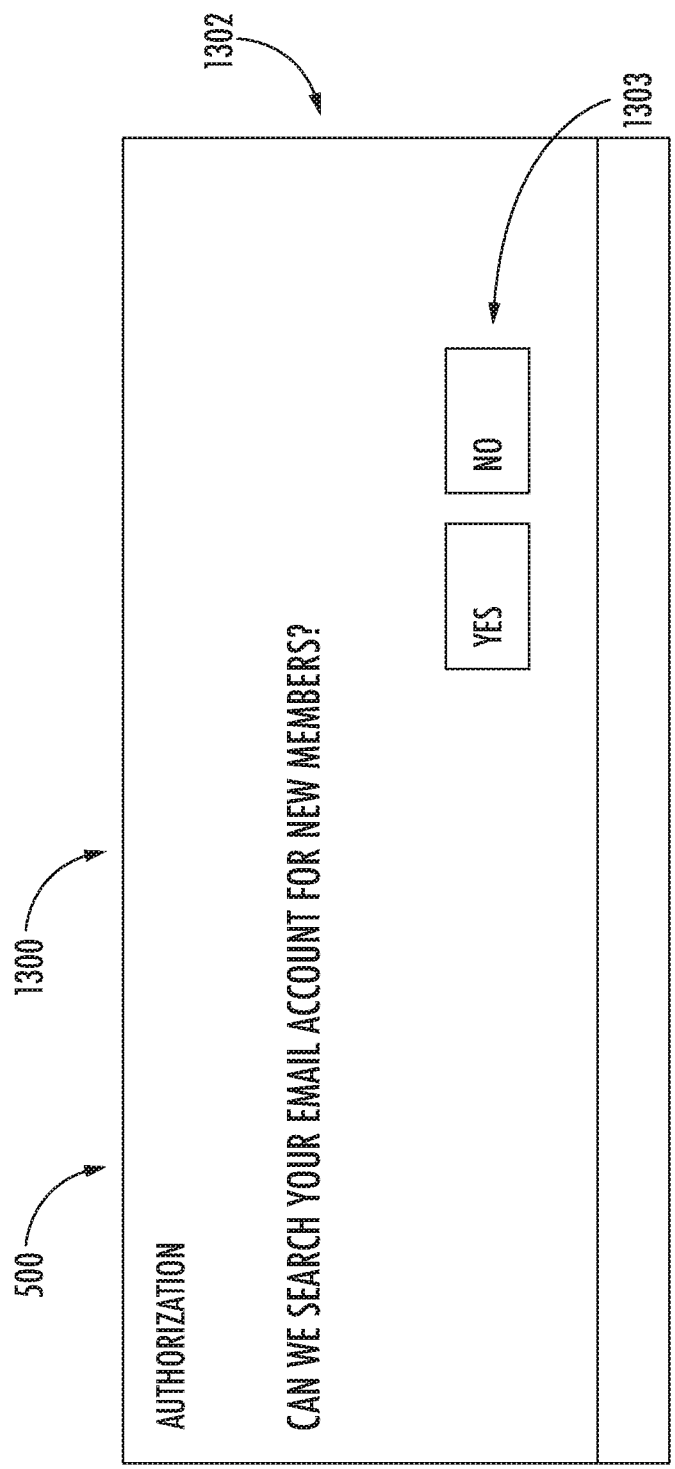
Figure 14:
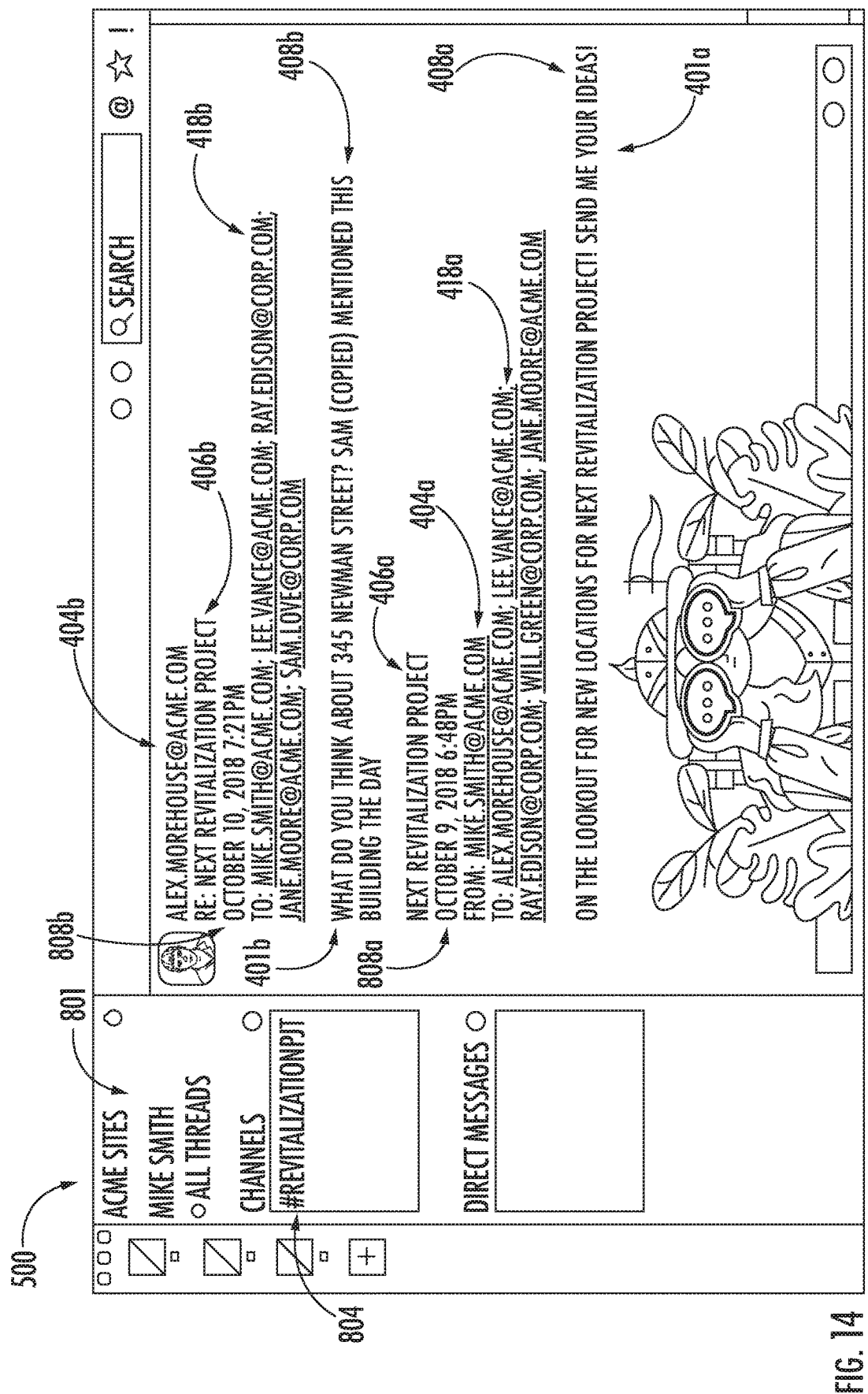
Figure 15:
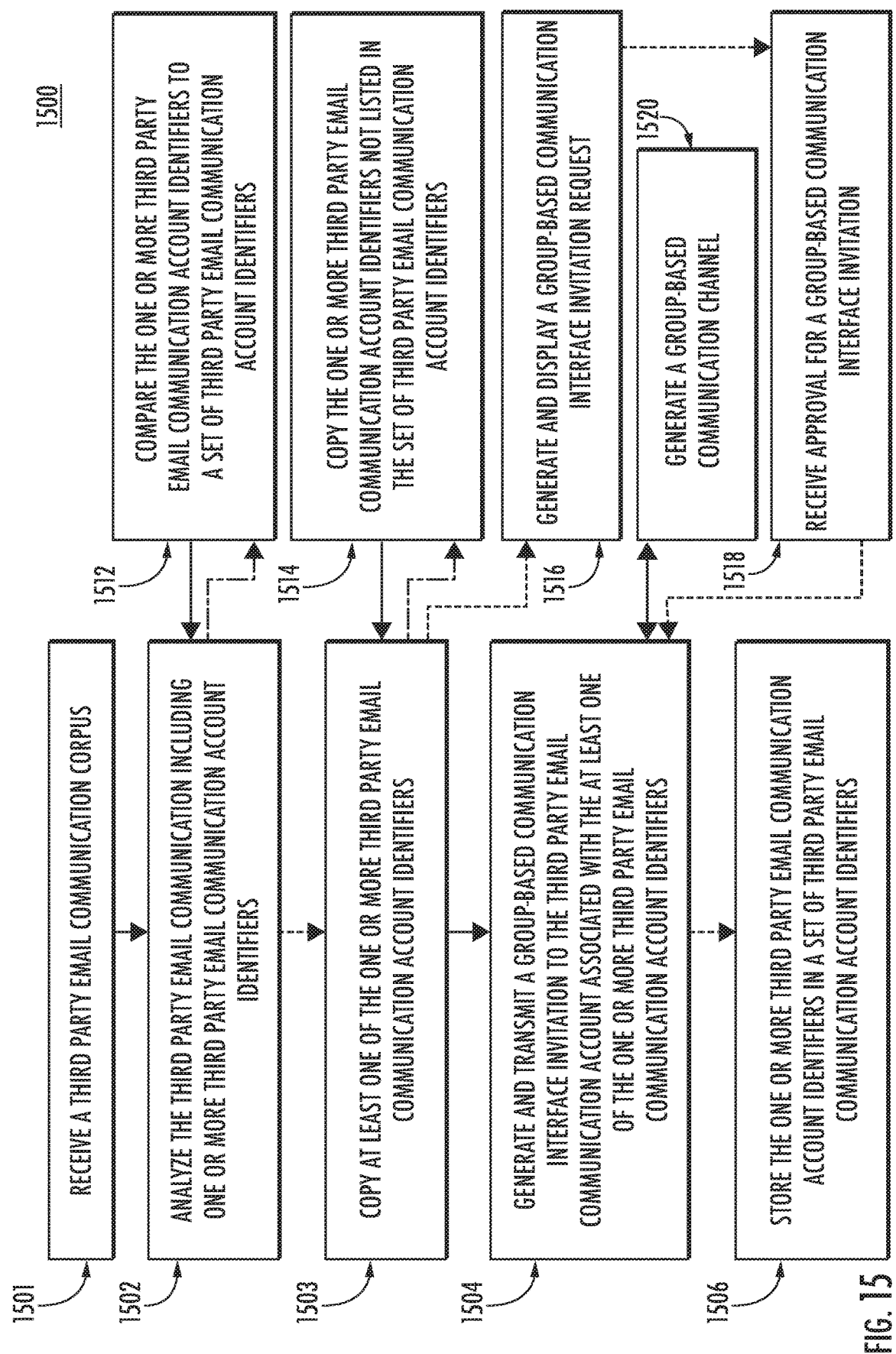

Having thus described the disclosure in general terms, reference will now be made to the accompanying drawings, which are not necessarily drawn to scale, and wherein:

FIG. 1 is a system architecture diagram of an exemplary group-based communication system configured to practice embodiments of the present disclosure;

FIG. 2 is an exemplary schematic diagram of a computing entity according to one embodiment of the present disclosure;

FIG. 3a illustrates an exemplary onboarding repository according to one embodiment of the present disclosure;

FIG. 3b illustrates an exemplary onboarding module according to one embodiment of the present disclosure;

FIG. 4 illustrates an exemplary third party email communication account interface according to one embodiment of the present disclosure;

FIG. 5 illustrates the creation of group-based communication interface identifiers according to one embodiment of the present disclosure;

FIG. 6 illustrates an exemplary third party email communication account interface forwarding a third party email communication corpus to a group-based communication interface account according to one embodiment of the present disclosure;

FIG. 7 illustrates an exemplary creation of a group-based communication channel identifier according to one embodiment of the present disclosure;

FIG. 8 illustrates an exemplary group-based communication channel in the group-based communication interface according to one embodiment of the present disclosure;

FIG. 9 illustrates an exemplary group-based communication interface invitation according to one embodiment of the present disclosure;

FIG. 10 illustrates an exemplary creation of a third party email communication corpus in the group-based communication interface according to one embodiment of the present disclosure;

FIG. 11 illustrates an exemplary group-based communication interface forwarding a third party email communication corpus to a group-based communication interface account according to one embodiment of the present disclosure;

FIG. 12 illustrates an exemplary group-based communication invitation request according to one embodiment of the present disclosure;

FIG. 13 illustrates a request to access a third party email communication account according to one embodiment of the present disclosure;

FIG. 14 illustrates an exemplary third party email communication account interface according to one embodiment of the present disclosure;

FIG. 15 is a flowchart illustrating operations that are executed by an exemplary group-based communication system for onboarding according to one embodiment of the present disclosure;

FIG. 16 is a flowchart illustrating operations that are executed by an exemplary group-based communication system for onboarding according to one embodiment of the present disclosure;

FIG. 17 illustrates is a flowchart illustrating operations that are executed by an exemplary group-based communication system for onboarding according to one embodiment of the present disclosure.

Figure 18:
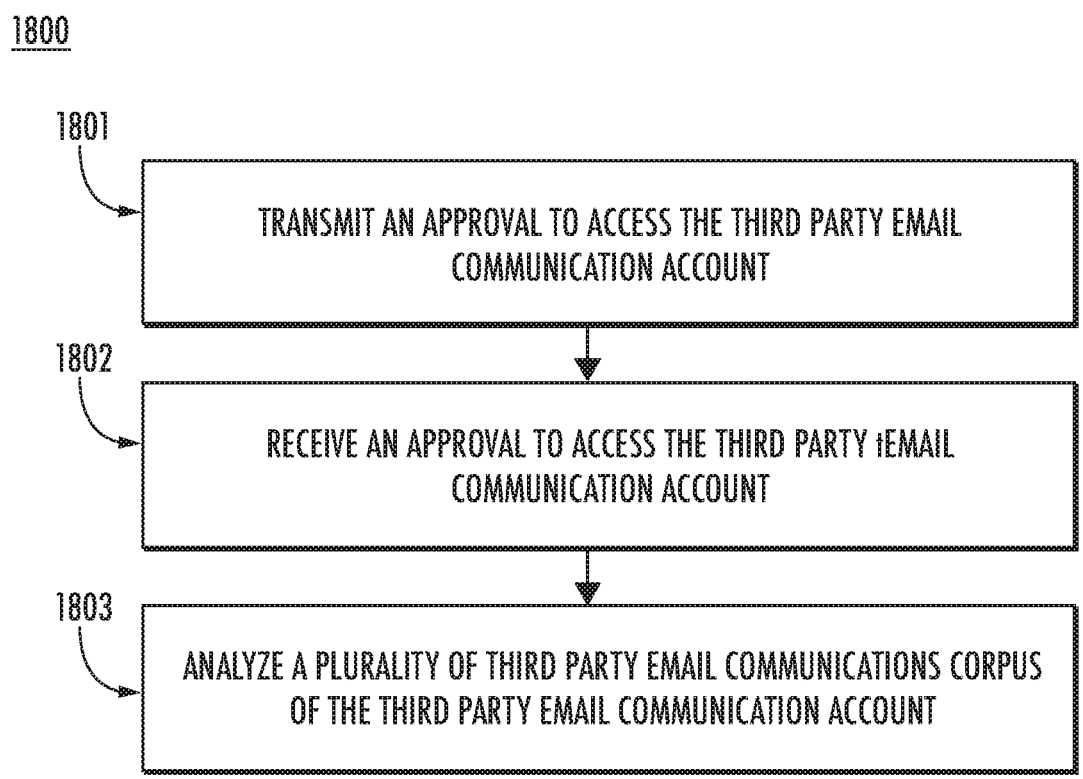
Figure 22:
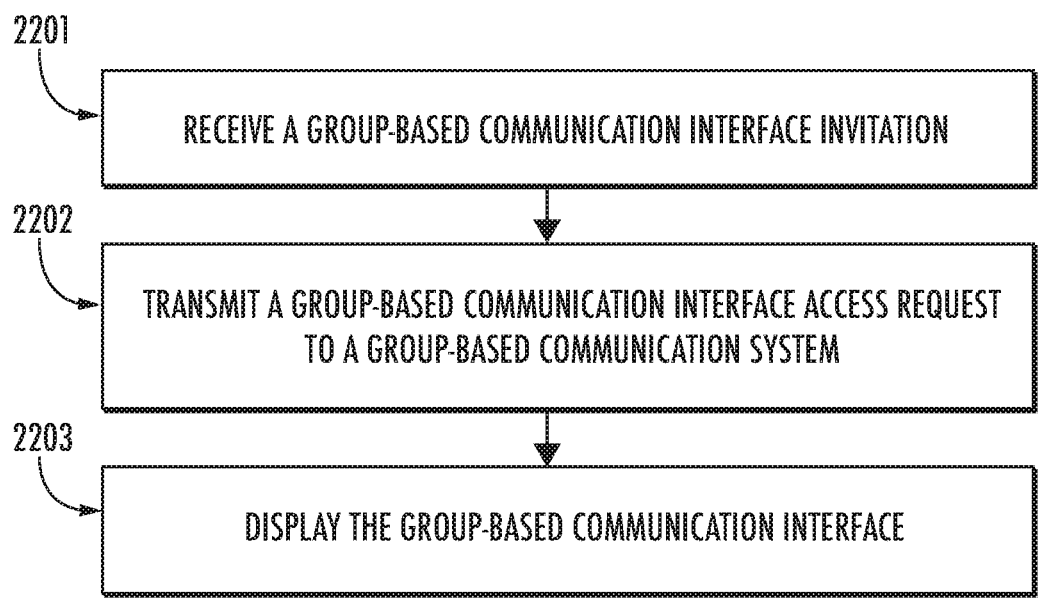

FIG. 18 illustrates is a flowchart illustrating operations that are executed by an exemplary group-based communication system for onboarding according to one embodiment of the present disclosure FIG. 19 illustrates is a flowchart illustrating operations that are executed by an exemplary group-based communication system for onboarding according to one embodiment of the present disclosure FIG. 20 illustrates is a flowchart illustrating operations that are executed by an exemplary group-based communication system for onboarding according to one embodiment of the present disclosure FIG. 21 illustrates is a flowchart illustrating operations that are executed by an exemplary group-based communication system for onboarding according to one embodiment of the present disclosure; and FIG. 22 illustrates is a flowchart illustrating operations that are executed by an exemplary group-based communication system for onboarding according to one embodiment of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention are directed to systems and devices that are configured to execute an email communication import protocol in a selected group-based communication interface (e.g., a user interface that is configured for messaging communications for a given enterprise such as ACME Corp). Executing an email communication import protocol in the selected group-based communication interface may be referred to as "onboarding" as email communications are integrated into the existing selected group-based communication interface of the group-based communication system.

The selected group-based communication interface may be part of a plurality of group-based communication interfaces (e.g., user interfaces that are configured for messaging communications of other enterprises such as Beta Corp or Charlie Corp). The selected group-based communication interface includes a plurality of group-based communication channels (e.g., a marketing channel, sales channel, accounting channel, etc.). The selected group-based communication interface is accessible and viewable to a select group of users or "members", such as a group of employees of a business or organization (e.g., the ACME Corp interface would be accessible and viewable to ACME Corp employees but not to Beta Corp employees).

The group-based communication system communicates with third party email communication accounts to execute an email communication import protocol in a selected group-based communication interface. The group-based communication system is configured to receive a third party email communication corpus and analyze the third party email communication corpus to identify potential new members of the group-based communication interface and then provide group-based communication interface invitations with user engageable links to the potential new members via the third party email communication accounts of each potential new member. The group-based communication system may parse the third party email communication corpus to identify the third party email communication accounts by identifying third party email communication account identifiers associated with the third party email communication corpus. The user engageable links allow users of the third party email communication accounts to access the group-based communication interface.

The group-based communication system may allow for the creation of group-based communication channels within the group-based communication interface based on third party email communications to provide a designated virtual environment for conversations regarding the third party email communication corpus to take place. The group-based communication system may programmatically format the content of the third party email communication into the protocol of the group-based communication interface. The user of the third party email communication account then has access to the content of the third party email communication corpus through the group-based communication system. The new members may access the group-based communication channel through the user engageable link in the group-based communication interface invitation and then enjoy the benefits of the group-based communication interface.

The selected group-based communication interface is updated and arranged per the actions of the members of that group-based communication interface and is separate and distinct from other group-based communication interfaces. Each of the plurality of group-based communication channels in the selected group-based communication interface may include one or more group-based messaging communications, or may be empty (in that the selected group-based communication channel may not contain a group-based messaging communication at a certain point in time).

The group-based communication system may execute an email communication import protocol in a selected group-based communication interface (the selected group-based communication interface). A current member of the group-based communication interface may initiate a group-based communication interface request to generate a group-based communication interface account. The current member (via a client device) may receive a group-based communication interface account identifier. A third party email communication corpus may then be forwarded to the group-based communication interface account to initiate a group-based communication interface invitation request. The group-based communication system may analyze the third party email communication corpus as discussed herein to identify third party email communication accounts by parsing the third party email communication corpus to identify third party email communication account identifiers. A group-based communication interface invitation may then be generated and transmitted to the third party email communication account. The group-based communication interface invitation may include a user engageable link that is configured to allow access to the group-based communication interface.

In some embodiments, a third party email communication corpus may be received by the group-based communication system. The group-based communication system may be configured to receive third party communications from the third party email communication account when the third party email communication account is in receipt of the third party communication. In some embodiments, the user associated with the third party email communication account may initiate the transmission of the third party communication to the group-based communication system.

The group-based communication system may parse the third party email communication corpus to identify third party email communication account identifiers, compare third party email communication account identifiers listed in the third party email communication corpus to a set of third party email communication account identifiers associated with the group-based communication interface (e.g., particular to the group-based communication channel or not), and copy third party email communication account identifiers not listed in the set of third party email communication account identifiers. The group-based communication system may then generate a group-based communication interface invitation request to send group-based communication interface invitations to the copied third party email communication account identifiers. The current member (via a client device) may then approve or deny the group-based communication interface invitation request for each of the copied third party email communication account identifiers. For the approved group-based communication interface invitation requests, a group-based communication interface invitation may be generated and transmitted to the respective copied third party email communication account identifiers, providing access to the group-based communication interface to the new member associated with the respective third party email communication accounts via the group-based communication interface invitation.

In some embodiments, a request to access a third party email communication account may be generated and displayed in the group-based communication interface. The request to access a third party email communication account may be generated in response to a new member accessing the group-based communication interface, a current member accessing the group-based communication interface, or various other events in the group-based communication system. In response to a request to access a third party email communication account being generated and displayed, an approval to access the third party email communication account may be received. In response to an approval to access the third party email communication account, the group-based communication system may parse a plurality of third party email communication corpus of the third party email communication account to identify third party email communication account identifiers, compare third party email communication account identifiers listed in the plurality of third party email communication corpus to a set of third party email communication account identifiers associated with the group-based communication interface (e.g., particular to the group-based communication channel or not), and copy third party email communication account identifiers not listed in the set of third party email communication account identifiers. The group-based communication system may then generate a group-based communication interface invitation request to send group-based communication interface invitations to the copied third party email communication account identifiers. A current member (via a client device) may then approve or deny the group-based communication interface invitation request for each of the copied third party email communication account identifiers. For the approved group-based communication interface invitation requests, a group-based communication interface invitation may be generated and transmitted to the respective copied third party email communication account identifiers, providing access to the group-based communication interface to the new member associated with the respective third party email communication accounts.

In some embodiments, a denial of access the third party email communication account may be received such that the group-based communication system may not access the third party email communication account.

In some embodiments, when analyzing one or more third party email communication corpus, the group-based communication system may analyze the history of the third party email communication corpus to identify third party email communication account identifiers not listed in the set of third party email communication account identifiers associated with the group-based communication interface. That is, for example, when third party email communication corpus are transmitted to a first set of third party email communication account identifiers, then transmitted to a second set of third party email communication account identifiers, and then transmitted to a third set of third party email communication account identifiers, the group-based communication interface may identify each third party email communication account identifier listed in any of the sets of third party email communication account identifiers that is not part of the set of third party email communication account identifiers associated with the group-based communication interface (i.e., non-members of the group-based communication interface). In other words, the group-based communication system may analyze the history of the third party email communication corpus to identify potential new members of the group-based communication interface. A group-based communication interface invitation request may be generated and displayed as discussed above and herein leading to a group-based communication interface invitation being transmitted to the potential new members.

The group-based communication interface invitation may include a user engageable link that is configured to allow access to a group-based communication channel of the group-based communication interface.

The group-based communication channel may include content of the third party email communication corpus, such as the subject line of the third party email communication corpus, body of the third party email communication corpus, one or more third party email communication account identifiers associated with the third party email communication corpus, latency indicators, the like, or combinations thereof, that may be formatted into a messaging communication of the group-based communication channel. When accessing the group-based communication interface through the group-based communication interface invitation, the new user (via a client device) is able to view the context in which the group-based communication interface invitation was created (e.g., the third party email communication corpus associated with the group-based communication interface invitation). The new user (via a client device) may then generate and transmit messaging communications through the group-based communication channel to other members of the group-based communication channel. The other members of the group-based communication channel may include members associated with third party email communication accounts associated with third party email communication account identifiers listed in the third party email communication corpus and/or other members of the group-based communication interface.

In some embodiments, the group-based communication channel may have a group-based communication channel identifier. The group-based communication channel identifier may be created by the current member initiating a group-based communication channel request and specifying the group-based communication channel identifier. In some embodiments, the group-based communication channel identifier may be generated in response to receipt of a third party email communication corpus by the group-based communication system and associated with the group-based communication interface. The group-based communication channel identifier may be generated based on a content of the third party email communication corpus, such as a subject line or body of the third party email communication corpus, to identify the third party email communication corpus associated with the group-based communication channel.

The group-based communication system allows for access to the selected group-based communication interface efficiently and effectively and provides an interface for group-based communications. Third party email communication corpus can be relegated to group-based communication channels to continue conversations without congesting third party email communication accounts, while also informing the participants of the third party email communication corpus that the group-based communication channel has been created and allowing those participants to access and view the conversations.

In prior processes of onboarding, a user had to manually send each potential new member an invitation to join the group-based communication interface. Further, when the potential new member received the invitation, the invitation would have no context regarding the group-based communication interface and why the potential new member was being invited to join the group-based communication interface. However, in the present group-based communication system, a group-based communication channel may be created based on a third party email communication corpus and may include all or a portion of the body of the third party email communication corpus. The group-based communication channel may also have a group-based communication channel identifier that indicates the subject of the third party email communication corpus. Thus, the group-based communication channel may provide the new member context regarding the group-based communication interface and why the new member was invited. The group-based communication system is able to programmatically translate a third party email communication corpus into a message communication of the group-based communication system. That is, the group-based communication system is able to translate messages from one set of protocols to another set of protocols, where the two sets of protocols are different. The group-based communication system is able to import third party email communication corpus and translate the third party email communication corpus into a component of the group-based communication system. Content of the third party email communication corpus is then displayed in the group-based communication interface. The content may be displayed in a group-based communication channel, a thread, a direct message, or other virtual environment of the group-based communication interface. The group-based communication system allows for conversion of a third party email communication corpus to the group-based communication system.

In the present group-based communication system, the users associated with the third party email communication account identifiers listed in the third party email communication corpus may be members of the group-based communication channel, thereby establishing a location for the discussion regarding the content of the third party communication to continue in the group-based communication interface.

In the present group-based communication system, the current member may initiate the creation of the group-based communication channel and may request a group-based communication interface account and the group-based communication interface identifier. However, in some embodiments, the group-based communication system may analyze the current member's third party email communication corpus, identify potential new members, and then create group-based communication channels based on the third party email communication corpus associated with the identified potential new members.

Accordingly, more potential new members may be identified by the group-based communication system than in prior systems, leading to more users benefiting from the group-based communication system. For example with third party email communication accounts, a third party email communication corpus may be organized into a folder. However, no one besides that user can access the folder or use the folder to organize their third party email communications. The group-based communication system organizes messaging communications into group-based communication feeds that are viewable to each member of the feed. Thus, the group-based communication interface is organized to allow members of the group-based communication interface to spend less time reading and reviewing irrelevant information and allows a member to quickly access the latest information in each group-based communication channel, thereby increasing the efficiency and effectiveness of group-based messaging communications. The selected group-based communication interface is configured to allow members of the group-based communication interface to communicate within group-based communication channels, threads, and direct messages to provide relevant information to other members efficiently and effectively.

Further, with third party email communication accounts, one copy of a message may be stored per recipient. However, in the group-based communication system, with email channeling into the group-based communication interface for onboarding, many recipients are able to view/edit a single copy of a group-based messaging communication in the group-based communication system. As new members join the group-based communication system, additional copies are not necessary as the new members can also view the single copy. Thus, the group-based communication system allows for reduced strain on the system and reduced client storage. The selected group-based communication interface thereby efficiently and effectively provides an interface for group-based communications rooted in computer technology in order to overcome a problem specifically arising in the realm of computer networks. The selected group-based communication interface may be used as part of a standalone service, application, or device or it may be applied as a layer atop an existing service application or device.

The group-based communication system is able to import messages from a third party email communication account into the group-based communication system. The third party email communication account is based on a different protocol than the group-based communication. However, the group-based communication system is able to include, in the group-based communication interface, content from the third party email communication corpus such that the information can be displayed in the group-based communication interface and not lost in the transfer. In some embodiments, the third party email communication corpus may relate to a single user's third party email communication corpus, a group of users' third party email communication corpus, or to part or all of an enterprise's third party email communication corpus. In the latter, an entire enterprise's third party email communication corpus may be imported into the group-based communication system, parsed, and result in group-based communication interface invitations and group-based communication channels organized based on the third party email communication corpus.

As will be discussed in greater detail below, the selected group-based communication interface is not limited to displaying group-based messaging communications and can also be configured to display a wide variety of messaging communications for any purpose that might be of interest to a member (e.g., direct messaging communications). The selected group-based communication interface may be used to visualize any set of group-based communication channels and messaging communications for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messaging communications on a selected group-based communication interface.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Group identifiers (defined below) are used to associate data, information, messages, etc., with specific groups.

A group-based communication interface is a user interface of the group-based communication system and has security sufficient such that it is accessible only to a defined group of users. As discussed herein, access may be facilitated by a group-based communication interface invitation to join transmitted by one group member user to another non-member user. As used herein, a "group-based communication interface account" is a designation to which messages may be delivered in the group-based communication system and associated with the respective group-based communication interface. The group-based communication interface account may have an identifier, referred to as a group-based communication identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

As used herein, the term "group-based communication feed" refers to a virtual communications environment or stream of communications that is configured to display messaging communications posted by members (e.g., validated users accessing the environment using client devices) that are viewable only to the members of the group. As discussed herein, the group-based communication interface may include various types of group-based communication feeds, which may have subsidiary group-based communication feeds. For instance, the group-based communication interface may include group-based communication channels, threads, direct messages, and other collections of messaging communications.

A "group-based communication channel" refers to a virtual communications environment that is configured to display messaging communications posted by channel members (e.g., validated users accessing the environment using client devices) that are viewable only to the members of the group. In the hierarchy of group-based communication feeds, group-based communication channels are generally the main group-based communication feeds, with threads being a subsidiary feed started from a group-based communication channel and direct messages being a group-based communication feed between two parties. Throughout the present disclosure, reference is primarily made to group-based communication channels associated with group-based communication interface invitation requests. However, the same principles may apply to threads and direct messages allowing access to threads and/or direct messages from group-based communication interface invitations.

The format of the group-based communication channel may appear differently to different members of the group-based communication channel; however, the content of the group-based communication channel (e.g., messaging communications) may be displayed to each member of the group-based communication channel. For instance, in one embodiment, a common set of group-based messaging communications will be displayed to each member of the respective group-based communication channel such that the content of the group-based communication channel (e.g., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps. As discussed herein, the group-based communication channel may include various information regarding third party communications associated with the group-based communication channel.

A "thread" is a collection of message communications displayed to a subsidiary feed arising from or otherwise associated with a selected group-based messaging communication displayed in a selected group-based communication channel. A thread may include one or more "threaded messages" or "thread communication messages" that are linked together in the subsidiary feed, wherein each is associated with the selected group-based messaging communication.

A "direct message" is a collection of message communications between two users of the group-based communication system.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

As used herein, the term "profile identifier" refers to any data that identifies a user. For example, and without limitation, a profile identifier may include a unique identifier, an IP address, a MAC address, and the like.

As used herein, a "thread-associated user profile" refers to a user profile that is associated with the respective thread. A "channel-associated user profile" refers to a user profile that is associated with the respective channel. For instance, if a member follows a thread, then the member will be considered a thread-associated user profile.

As used herein, the term "profile data" refers to any data associated with a profile identifier, such as, but not limited to, biographical data or any other data that may serve to distinguish one or more profiles from each other.

As used herein, the term "biographical data" refers to information associated with a person(s) identified in a profile, such as, for example, birth dates, allergies, socioeconomic data, interests, place of residence, login credential information, and/or any other identifying information about a profile.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication," refer to any electronically generated digital content object provided by a user using a client device and configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message communication sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

As used herein, "messaging communication information" refers to any information associated with the messaging communication, such as information related to the user who created the messaging communication, the group-based communication channel on which the messaging communication was first provided or is associated with (e.g., the name of the group-based communication channel), the time and date that the messaging communication was first provided, threads stemming from the messaging communication (e.g., date and time the thread was made or last received a messaging communication, etc.), and any other identifying information related to the messaging communication.

As used herein, "message" refers to any electronically generated digital content object provided by a user using a client device. Messages may include any text, image, video, audio, or combination thereof provided by a user (using a client device). For instance, the user may provide a message that includes text as well as an image and a video within the message as message contents. In such a case, the text, image, and video would comprise the message or digital content object. A message may refer to a messaging communication (i.e., messages displayed in the group-based communication interface) and a message in a third party email communication corpus (i.e., messages displayed in the third party email communication interface).

As used herein, "request" refers to an instruction or direction, generally initiated by a user, for an action to take place. For instance, a user may request to view profile data of another user, view certain messaging communication information, view a selected group-based communication feed request (e.g., group-based communication feed request, or more specifically selected channel view request, selected thread view request), create a group-based interface account (e.g., group-based communication interface request), invite a potential new member to a group-based communication interface (e.g., group-based communication interface invitation), to review third party email communication corpus of a third party email communication account (e.g., request to access third party email communication account), view a group-based communication interface (e.g., a group-based communication interface access request), etc.

A "sending user identifier" is associated with a collection of messages (e.g., message communications or third party email communication corpus) that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The "third party email communication account" is a software program, application, platform, or service that is configured to provide communication services to a client device. The third party email communication account operates on a compiled code base or repository that is separate and distinct from that which supports the group-based communication system. In some embodiments, the third party email communication account may communicate with the group-based communication system, and vice versa, through one or more application program interfaces (APIs). In some embodiments, the third party email communication account receives tokens or other authentication credentials that are used to facilitate secure communication between the remote resource and the group-based communication system in view of group-based communication system network security layers or protocols (e.g., network firewall protocols). The third party email communication account may have an identifier, referred to as a third party email communication account identifier, that identifies the third party email communication account and may comprise ASCII text, a pointer, a memory address, and the like. For instance, the third party email communication account identifier may be an email address (e.g., comprising a local-part, an @ symbol, then a case-insensitive domain).

The term "third party email communication corpus" refers to one or more message or message object(s) that is stored to a memory or database associated with the third party email communication account but which may be sent to the group-based communication system. In some embodiments, the third party email communication corpus is stored to a remote data object address, which may be a uniform resource locator (URL), an Internet address, or an intranet domain. The third party email communication corpus may include a time stamp, source third party email communication account identifier, recipient third party email communication account identifier, subject line, body of email, and the like. The third party email communication corpus does not include a group-based communication channel identifier, thread identifier, direct message identifier within the group-based communication system, or other similar metadata specific to the group-based communication system, and thus, is not disposed within the group-based communication interface like a message communication. The third party email communication corpus may include each message transferred and/or received by the third party email communication account; each message transferred and/or received by the third party email communication account and associated with a select topic, date, subject line, source third party email communication account identifier, recipient third party email communication account identifier, attachment, etc.; or a single message transferred and/or received by the third party email communication account. The third party email communication corpus relies on a different protocol than the group-based communication system.

The term "locally stored data objects" refers to a file(s), a call object(s), a task(s), an event object(s), or a calendar object(s) that is stored to a memory or database associated with the group-based communication system.

The term "local apparatus memory" refers to the memory or database associated with the group-based communication system storing the locally stored data objects.

The term "third party email communication account memory" refers to the memory or database associated with the third party email communication account storing the remotely stored data objects. Any of the requests, communications, invitations, data, etc. discussed herein may be stored on a third party email communication account memory and/or a local apparatus memory.

A "group-based communication interface invitation" refers to a messaging communication generally directed to a third party email communication account that allows access to the group-based communication interface. The invitation is generally specific to the group-based communication interface (that is, not an invitation to access all of the group-based communication interfaces) and generally includes a user engageable link to access the respective group-based communication interface.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example group-based communication system 105 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107. Client devices 101A-101N may interact peer-to-peer or may interact through group-based communication server 106 and group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 902.11, 902.16, 902.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit requests, invitations, communications, identifiers, etc., and the like provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of requests, invitations, communications, identifiers, and the like organized within the group-based communication repository 107.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, requests, invitations, communications, identifiers, and the like may be sent from a client device 101A-101N to a group-based communication system 105. In various implementations, the requests, invitations, communications, identifiers, and the like may be sent to the group-based communication system 105 over communications network 104 directly by a client device 101A-101N, the requests, invitations, communications, identifiers, and the like may be sent to the group-based communication system 105 via an intermediary such as an intermediate server or another client device 101A-101N, and/or the like. For example, the client device 101A-101N may be a desktop, a laptop, a tablet, a smartphone, and/or the like that is executing a client application (e.g., a group-based communication app). In one implementation, the requests, invitations, communications, identifiers, and the like may include data such as a participating device identifier, sending user identifier, a group identifier, a group-based communication channel identifier, third party email communication account identifiers, attachments (e.g., files), profile data, group-based communication interface data, third party email communication account data, third party email communication corpus data, group-based communication channel data, messaging communication data, third party metadata, and/or the like. In one embodiment, the client device 101A-101N may provide message communications substantially in the form of a (Secure) Hypertext Transfer Protocol ("HTTP(S)") POST message including eXtensible Markup Language ("XML") formatted data as formatted according to the group-based communication system.

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details>//iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>Error! Reference source not found..app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
```

```
        <message_identifier>ID_message_10</message_identifier>
        <team_identifier>ID_team_1</teamjdentifier>
        <channel_identifier>ID_channel_1</channeljdentifier>
        <contents>That is an interesting invention. I have attached a copy our patent
policy.</contents>
        <attachments>patent_policy.pdf</attachments>
    </message>
</auth_request>
```

The group-based communication system 105 comprises at least one group-based communication server 106 that may create a storage messaging communication or storage third party email communication account identifier to facilitate indexing and storage in a group-based communication repository 107. In one implementation, the storage third party email communication corpus or storage third party email communication account identifier may include data such as a sending user identifier, a group identifier, a group-based communication channel identifier, third party email communication account identifiers, attachments (e.g., files), profile data, group-based communication interface data, third party email communication account data, third party email communication corpus data, group-based communication channel data, messaging communication data, third party metadata, and/or the like. For example, the group-based communication server 106 may provide storage messaging communications or storage third party email communication account identifiers, substantially in the form of a HTTP(S) POST message including XML-formatted data. For example, the group-based communication server 106 may provide storage messaging communications substantially in the form of a HTTP(S) POST message including XML-formatted data as shown for example below.

```
POST /storage_message.php HTTP/1.1
Host: www.server.com
Content-Type: Application/XML
Content-Length: 667
<?XML version = "1.0" encoding = "UTF-8"?>
    <storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our
    patent policy.</contents>
    <attachments>patent_policy.pdf</attachments>
    <conversation_primitive>
        conversation includes messages: ID_message_8,
        ID_message_9, ID_message_10, ID_message_11,
        ID_message_12
    </conversation_primitive>
</storage_message>
```

In embodiments, a group identifier as defined above may be associated with the requests, invitations, communications, identifiers, and the like.

In embodiments, a group-based communication channel identifier as defined above may be associated with the requests, invitations, communications, identifiers, and the like.

In embodiments, a participating device identifier as defined above may be associated with the requests, invitations, communications, identifiers, and the like. In one implementation, the requests, invitations, communications, identifiers, and the like may be parsed (e.g., using PHP commands) to determine a participating device identifier of the device from which the requests, invitations, communications, identifiers, and the like originated.

In embodiments, topics may be associated with the requests, invitations, communications, identifiers, and the like. In one implementation, the requests, invitations, communications, identifiers, and the like may be parsed (e.g., using PHP commands) to determine topics associated the requests, invitations, communications, identifiers, and the like. In another example, the requests, invitations, communications, identifiers, and the like may be analyzed (e.g., by itself, with other requests, invitations, communications, identifiers, and the like) or parsed using a machine learning technique, such as topic modeling, to determine topics associated with the requests, invitations, communications, identifiers, and the like.

In embodiments, data indicating responses may be associated with the requests, invitations, communications, identifiers, and the like. For example, responses to the requests, invitations, communications, identifiers, and the like by other users may include reactions (e.g., selection of an emoji associated with the communication, selection of a "like" button associated with the communication), clicking on a hyperlink embedded in the invitation or communication, replying to the requests, invitations, communications, identifiers, and the like, downloading a file associated with the requests, invitations, communications, identifiers, and the like, sharing the invitations, communications, identifiers, and the like from one group-based communication channel to another group-based communication channel, pinning the invitations, communications, identifiers, and the like, starring the invitations, communications, identifiers, and the like, and/or the like. In one implementation, data regarding responses to the requests, invitations, communications, identifiers, and the like by other users may be included with the requests, invitations, communications, identifiers, and the like, and the requests, invitations, communications, identifiers, and the like may be parsed (e.g., using PHP commands) to determine the responses. In another implementation, data regarding responses to the requests, invitations, communications, identifiers, and the like may be retrieved from a database. For example, data regarding responses to the message may be retrieved via a MySQL database command.

For example, data regarding responses to the requests, invitations, communications, identifiers, and the like may be used to determine context for the requests, invitations, communications, identifiers, and the like (e.g., a social score for the communication from the perspective of some user). In another example, data regarding responses to the requests, invitations, communications, identifiers, and the like may be analyzed to determine context regarding the user (e.g., the user's expertise in a topic may be determined based on the responses to the user's communications regarding the topic).

In embodiments, attachments may be included with the requests, invitations, communications, identifiers, and the like. If there are attachments, files may be associated with the requests, invitations, communications, identifiers, and the like. In one implementation, the requests, invitations, communications, identifiers, and the like may be parsed (e.g., using PHP commands) to determine file names of the attachments. For example, file contents may be analyzed to determine context for the requests, invitations, communications, identifiers, and the like (e.g., a patent policy document may indicate that the requests, invitations, communications, identifiers, and the like is associated with the topic "patents").

In embodiments, third party metadata may be associated with the requests, invitations, communications, identifiers, and the like. For example, third party metadata may provide additional context regarding the requests, invitations, communications, identifiers, and the like or the user that is specific to a company, group, group-based communication channel, and/or the like. In one implementation, the requests, invitations, communications, identifiers, and the like may be parsed (e.g., using PHP commands) to determine third party metadata. For example, third party metadata may indicate whether the user who sent the requests, invitations, communications, identifiers, and the like is an authorized representative of the group-based communication interface (e.g., an authorized representative may be authorized by the company to respond to questions in the group-based communication system).

In embodiments, a conversation primitive may be associated with the requests, invitations, communications, identifiers, and the like. In one implementation, a conversation primitive is an element used to analyze, index, store, and/or the like requests, invitations, communications, identifiers, and the like. For example, the requests, invitations, communications, identifiers, and the like may be analyzed by itself, and may form its own conversation primitive. In another example, the requests, invitations, communications, identifiers, and the like may be analyzed along with other requests, invitations, communications, identifiers, and the like, and the requests, invitations, communications, identifiers, and the like that make up the discussion may form a conversation primitive. In one implementation, the conversation primitive may be determined as the requests, invitations, communications, identifiers, and the like, a specified number (e.g., two) of preceding requests, invitations, communications, identifiers, and the like and a specified number (e.g., two) of following requests, invitations, communications, identifiers, and the like. In another implementation, the conversation primitive may be determined based on analysis of topics discussed in the discussion and other requests, invitations, communications, identifiers, and the like (e.g., in the discussion) and/or proximity (e.g., requests, invitations, communications, identifiers, and the like send order proximity, requests, invitations, communications, identifiers, and the like send time proximity) of these requests, invitations, communications, identifiers, and the like.

In embodiments, various metadata, determined as described above, and/or the contents of the requests, invitations, communications, identifiers, and the like may be used to index the requests, invitations, communications, identifiers, and the like (e.g., using the conversation primitive) to facilitate various facets of searching (i.e., search queries that return results from group-based communication repository 107). In one implementation, a storage requests, invitations, communications, identifiers, and the like may be sent from group-based communication server 106 to facilitate indexing in group-based communication repository 107. In another implementation, metadata associated with the requests, invitations, communications, identifiers, and the like may be determined and the requests, invitations, communications, identifiers, and the like may be indexed in group-based communication repository 107. In one embodiment, the requests, invitations, communications, identifiers, and the like may be indexed such that a company's or a group's requests, invitations, communications, identifiers, and the like are indexed separately (e.g., in a separate index associated with the group and/or company that is not shared with other groups and/or companies). In one implementation, requests, invitations, communications, identifiers, and the like may be indexed at a separate distributed repository (e.g., to facilitate data isolation for security purposes).

If there are attachments associated with the requests, invitations, communications, identifiers, and the like, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The client devices 101A-101N and/or group-based communication server 106 may be embodied by one or more computing systems and include one or more components shown in circuitry 200 shown in FIG. 2. The circuitry 200 may include a processor 202, a memory 201, input/output circuitry 203, and communications circuitry 205. The circuitry 200 may, in some embodiments, also include group-based communication repository 107 and group-based communication circuitry 204, and in some embodiments, the circuitry 200 may include onboarding module 206 and onboarding repository 207. The circuitry 200 may be configured to execute the operations described above with respect to FIG. 1 and below with respect to FIGS. 15-22. Although these components 107 and 201-207 are described with respect to functional limitations, it should be understood that the particular implementations necessarily include the use of particular hardware. It should also be understood that certain of these components 107 and 201-207 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, identifiers, requests, communications, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the circuitry 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system 105. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

One or more of processor 202, group-based communication circuitry 204, and onboarding module 206 may control and direct the creation and transmitting of requests, invitations, communications, identifiers, and the like (e.g., group-based communication interface requests, group-based communication interface invitation requests, etc.), such as the operations discussed with regards to FIGS. 15-22. For instance in some embodiments, the onboarding module 206 may identify third party email communication account identifiers, process the data, and generate group-based communication interface invitations. The onboarding module 206 may control and direct any of the operations discussed with regards to FIGS. 15-22. The onboarding module 206 may be divided over a number of devices where certain operations occur on one or more of the devices. The onboarding module 206 may store third party email communication account identifiers, group-based communication interface invitations, group-based communication channels, third party email communication corpus, messaging communications, group-based communication interface identifiers, etc., and the like to support the operations of the onboarding module 206 and the remaining circuitry 200 via onboarding repository 207. In some embodiments, the onboarding module 206 may interact with group-based communication repository 107, onboarding repository 207, and/or memory 201 to retrieve and/or store third party email communication account identifiers, group-based communication interface invitations, group-based communication channels, third party email communication corpus, messaging communications, group-based communication interface identifiers, etc., and the like to support the operations of the onboarding module 206 and the remaining circuitry 200.

In some embodiments, onboarding repository 206 may be provided that includes profile data 307, group-based communication interface data 310, third party email communication account data 304, third party email communication corpus data 303, group-based communication channel data 308, messaging communication data 306, and/or analytical engine data 302. Profile data 304, in some embodiments, may include biographical data and/or preference data associated with individual profiles or group profiles. Messaging communication data 306 may include various information, such as messaging communication information (e.g., profile identifiers, time of receipt, topics, origination (e.g., whether through third party communication or locally through group-based communication interface), and the like). Group-based communication channel data 308 may include various information, such as information regarding creation of the group-based communication channels, profile identifiers associated with each group-based communication channel, time of last receipt of messaging communications in each group-based communication channel, and the like. Third party email communication account data 304, in some embodiments, may include various information related to third party email communication accounts, such as third party email communication account identifiers, security settings for respective third party email communication accounts, group-based communication interface access settings for respective third party email communication accounts, and the like. Third party email communication corpus data 303, in some embodiments, may include various information regarding third party email communication corpus, such as time stamps, source third party email communication account identifiers, recipient third party email communication account identifiers, subject lines, bodies of email, and the like. Additionally or alternatively, the onboarding repository 206 may include analytical engine data 302 which provides any additional information needed by the processor 202 in computing messaging communications, indications, and requests.

Onboarding module 207 can be configured to analyze multiple sets of requests, invitations, identifiers, group-based messaging communications, and third party email communication corpus, such as the data in the onboarding repository 206. In this way, onboarding module 207 may support multiple algorithms, including those discussed below with respect to group-based communication channels, group-based messaging communications, third party email communication corpus, and third party email communication account identifiers, etc., so that the selected algorithm may be chosen at runtime. Further, the present configuration can enable flexibility in terms of configuring additional contexts.

In some embodiments, with reference to FIG. 3B, the onboarding module 207 may include a context determination module 314, an analytical engine 316, and communications interface 318, all of which may be in communication with the onboarding repository 206. The onboarding module 207 may receive one or more requests, invitations, identifiers, group-based messaging communications, and third party email communication corpus and may generate the appropriate identifiers, invitations, messaging communications, and/or channels in response. The onboarding module 207 may use any of the algorithms or processes disclosed herein for receiving a requests, invitations, identifiers, group-based messaging communications, and third party email communication corpus, and generating the appropriate identifiers, invitations, messaging communications, and/or channels in response. In some other embodiments, such as when the circuitry 200 is embodied in a group-based communication server 106, group-based communication repository 107, and/or client devices 101A-101N, the onboarding module 207 may be located in another circuitry 200 or another device, such as another group-based communication server 106, group-based communication repository 107, and/or client devices 101A-101N.

The onboarding module 207 can be configured to access data corresponding to multiple third party email communication corpus, third party email communication accounts, group-based communication channels, and messaging communications, and generate one or more appropriate identifiers, invitations, messaging communications, and/or channels in response.

The system may receive a plurality of inputs 312, 315 from the circuitry 200 and process the inputs within the onboarding module 207 to produce an output 320, which may include appropriate identifiers, invitations, messaging communications, and/or channels in response. In some embodiments, the onboarding module 207 may execute context determination using the context determination module 314, process the data in an analytical engine 316, and output the results via a communications interface 318. Each of these steps may pull data from a plurality of sources including the onboarding repository 206.

When inputs 312, 315 are received by the onboarding module 207, a context determination using the context determination module 314 may be made. A context determination includes such information as a user or group preference data, when and what user initiated receipt of the input (e.g., when and who selected the actuator that initiated the request), what type of input was provided (e.g., was a group-based communication interface request initiated or a group-based communication interface invitation request initiated) and under what circumstances was receipt of the input initiated (e.g., was the input provided in the group-based communication interface or did it originate in a third party communication interface). This information may give context to the onboarding module 207 analysis to determine the output. For example, the context determination module 314 may inform the onboarding module 207 as to the group-based communication channel identifier to output, the group-based communication interface invitation to output, the group-based communication interface account and associated identifier to output, the messaging communication information to output with a group-based messaging communication, or other outputs.

The onboarding module 207 may then compute the output using the analytical engine 316. The analytical engine 316 draws information about the applicable group-based communication interface data 310, third party email communication account data 304, third party email communication corpus data 303, group-based communication channel data 308, messaging communication data 306, etc. from the onboarding repository 206 and then, in light of the context determination module's 314 determination, computes an output, which varies based on the input. The communications interface 318 then outputs the output 320 to the circuitry 200 for displaying on the selected group-based communication interface. For instance, the context determination module 314 may determine that a group-based communication interface request was received for a selected group-based communication interface by a certain user. Based on this information as well as the applicable profile data 307 and group-based communication interface data 310, etc., the analytical engine 316 may determine an appropriate output, such as presenting the appropriate group-based communication interface identifier. Similarly, the context determination module 314 may determine that a group-based communication interface invitation request was received. Based on this information as well as the applicable profile data 307, third party email communication account data 304, third party email communication corpus data 303, group-based communication channel data 308, and group-based communication interface data 310 etc., the analytical engine 316 may determine an appropriate output, such as generating and transmitting a group-based communication interface invitation to the appropriate third party email communication account.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, onboarding repository 206, and/or onboarding module 207 discussed above with reference to FIGS. 2, 3A, and 3B, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 201) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Example Methods and Systems for Onboarding Within the Group-Based Communication Network FIG. 4 illustrates an exemplary third party email communication account interface according to one embodiment of the present disclosure. In the embodiment illustrated in FIG. 4, the third party email communication account interface 400 includes a third party email communication account identifier 410 identifying the associated third party email communication account. The third party email communication account interface 400 lists a plurality of third party email communication messages 402, one of which is displayed on the third party email communication account interface 400. The selected third party email communication corpus 401 includes a subject line 406, a latency indicator 412 that indicates the time of receipt of the selected third party email communication corpus 401, a body 408 of the third party email communication corpus 401, a source third party email communication account identifier 404 to indicate the third party email communication account from which the third party email communication corpus 401 was transmitted, and several recipient third party email communication account identifiers 418 to indicate the third party email communication accounts in receipt of the third party email communication corpus 401. The third party email communication account interface 400 also includes a forward actuator 420 to allow for the selected third party email communication corpus 401 to be forwarded to other accounts.

In some embodiments, the third party email communication corpus 401 may be forwarded to the group-based communication system 105. For instance, the third party email communication corpus 401 may be forwarded to a group-based communication interface account where the third party email communication corpus 401 is associated with the group-based communication interface by a group-based communication interface identifier. The third party email communication corpus 401 may be analyzed by the group-based communication system 105 to determine potential new members of the group-based communication interface. For instance, in the embodiment illustrated in FIG. 4, the source third party email communication account identifier 404 and/or the recipient third party email communication account identifiers 418 may be associated to third party email communication accounts for users not yet members of the group-based communication interface. By parsing the third party email communication corpus to identify these third party email communication account identifiers in the third party email communication corpus 401, comparing the third party email communication account identifiers to a set of third party email communication account identifiers associated with the group-based communication interface, the group-based communication system 105 may identify third party email communication account identifiers not currently associated with the group-based communication interface, thus, indicating that the users associated with the respective third party email communication accounts may not yet be members of the group-based communication interface.

FIG. 5 illustrates the creation of a group-based communication interface account and associated group-based communication interface identifier according to one embodiment of the present disclosure. In the embodiment illustrated in FIG. 5, a group-based communication interface request has been initiated resulting in the generation of a group-based communication interface identifier 503 for the group-based communication interface account. The group-based communication interface 500 displays the generated group-based communication interface identifier 503. In the embodiment illustrated in FIG. 5, the group-based communication interface 500 also includes onboarding instructions 502 as well as an enable/disable actuator 504 for enabling or disabling the group-based communication interface account. For instance, in some embodiments, actuation of the enable/disable actuator 504 may enable or disable group-based communication interface invitation requests resulting from transmitting third party email communication corpus 401 to the group-based communication interface account. Thus, actuation of the enable/disable actuator 504 may prevent or allow for group-based communication interface invitations from being generated and transmitted to third party email communication accounts.

After the group-based communication interface account is created, third party email communication corpus 401 may be transmitted to the group-based communication interface account using the group-based communication interface identifier 503.

FIG. 6 illustrates an exemplary third party email communication account interface forwarding a third party email communication corpus 401 to a group-based communication interface identifier according to one embodiment of the present disclosure. In some embodiments, third party email communication corpus 401 may be forwarded to group-based communication interface identifiers 503 to initiate a group-based communication interface invitation. For instance, in the embodiment illustrated in FIG. 6, in the third party email communication account interface 400, the third party email communication corpus 401, which includes the body 408 of the communication, the subject line 406, and the other elements illustrated in FIG. 4, may be forwarded to the group-based communication interface account identified by the group-based communication interface identifier 503. The group-based communication interface identifier 503 may be generated as discussed above with respect to FIG. 5.

The receipt by the group-based communication system of the third party email communication corpus 401 with the group-based communication interface identifier 503 associated with the communication may lead to a group-based communication interface invitation request. The group-based communication system may analyze the third party email communication corpus 401 by parsing the third party email communication corpus 401 to identify third party email communication account identifiers (e.g., source third party email communication account identifier 404 and recipient third party email communication account identifiers 418), comparing third party email communication account identifiers listed in the third party email communication corpus 401 to a set of third party email communication account identifiers associated with the group-based communication interface. That is, the group-based communication system may compare the third party email communication account identifiers associated with the selected third party email communication corpus 401 with the third party email communication account identifiers stored in the group-based communication system and already associated with the selected group-based communication interface. The group-based communication system may then generate and display a group-based communication interface invitation request for approval by the current member.

FIG. 7 illustrates an exemplary group-based communication invitation request according to one embodiment of the present disclosure. In the embodiment illustrated in FIG. 12, the group-based communication invitation request 1200 is displayed on the group-based communication interface 500. The group-based communication invitation request 1200 includes invitation request instructions 1202 and invitation request actuators 1203 for approving or denying the group-based communication invitation for each of the respective third party email communication accounts. The group-based communication invitation request 1200 includes the third party email communication account identifiers 710 found to not be listed in the set of third party email communication account identifiers associated with the group-based communication interface. A group-based communication interface invitation may be generated for one or more of the third party email communication accounts associated with these third party email communication account identifiers 710 found to not be listed in the set of third party email communication account identifiers associated with the group-based communication interface.

If the group-based communication invitation request 1200 is approved for a third party email communication account, a group-based communication invitation may be generated and transmitted to the third party email communication account associated with the third party email communication account identifier 710 found to not be listed in the set of third party email communication account identifiers associated with the group-based communication interface and approved for inviting to the group-based communication interface 500.

FIG. 8 illustrates an exemplary group-based communication interface invitation according to one embodiment of the present disclosure. In the embodiment illustrated in FIG. 8, the group-based communication interface invitation 904 is received by the third party email communication account and displayed in the third party email communication account interface 400. The third party email communication account interface 400 includes a third party email communication account identifier 410 identifying the associated third party email communication account and displays the source third party email communication account identifier 404 and the recipient third party email communication account identifier 418. The subject line 406 is also displayed in the third party email communication account interface 400 along with a latency indicator 412. In the embodiment illustrated in FIG. 8, the group-based communication interface invitation 904 includes a user engageable link 902 to access the group-based communication interface. In the embodiment illustrated in FIG. 8, the user engageable link 902 is displayed with the group-based communication channel identifier 804. In the embodiment illustrated in FIG. 8, the group-based communication channel identifier 804 (shown for example in FIGS. 9 and 10) has been generated by the group-based communication system 105.

In some embodiments, the group-based communication system 105 will analyze the third party email communication corpus 401 to generate a group-based communication channel identifier 804. In such analysis, the group-based communication system 105 may use the subject line 406, body of the communication 408, one or more third party email communication account identifiers associated with the third party email communication corpus (e.g., source third party email communication account identifier 404 and recipient third party email communication account identifiers 418), or a combination thereof or other portion of the third party email communication corpus 401 to generate the group-based communication channel identifier 804. In some embodiments, there are system restraints on the length of the group-based communication channel identifier 804, thus, the group-based communication system 105 may shorten words (e.g., project becomes "pjt" or management becomes "mgt"). The group-based communication system 105 may have established conventions (e.g., number of letters, spacing, capitalization, short form of certain words, other algorithms, etc.) of the group-based communication interface to translate the content of the third party email communication corpus 401 (stored, for example, in components of circuitry 200) into a group-based communication channel identifier 804.

By selecting the user engageable link 902, the potential new member (e.g., the user associated with the third party email communication account in receipt of the group-based communication interface invitation 904) may access the group-based communication interface 500. In some embodiments, accessing the group-based communication interface 500 through the group-based communication interface invitation 904 may result in the display of a group-based communication channel associated with the third party email communication corpus 401 from which the group-based communication interface invitation 904 was generated.

The group-based communication channel may include a variety of information associated with the third party email communication corpus 401. For example, the group-based communication channel may include a message communication that includes content from the third party email communication corpus (401) (e.g., portions or all of the body 408 of the communication, the subject line 406, and the other elements illustrated in FIG. 4) as well as metadata associated with the third party email communication corpus 401 and metadata created by the group-based communication system to create the message communication (e.g., group identifier, channel identifier, etc. as discussed herein with regards to message communications). Information from the third party email communication corpus 401 is translated into a message communication for display in the group-based communication system. The translation of the information from the third party email communication corpus 401 may be programmatically performed based on established conventions of the group-based communication interface (e.g., size, spacing, metadata required, orientation of data within the group-based communication interface, association with members of the group-based communication interface and specifically the group-based communication channel, association with channels, threads, and direct messages, and other conventions that enable the group-based communication interface to operate within the group-based communication system).

FIG. 9 illustrates an exemplary group-based communication channel in the group-based communication interface according to one embodiment of the present disclosure. In the embodiment illustrated in FIG. 9, the group-based communication interface 500 includes the name of the particular member 801 ("Ray Edison") viewing the group-based communication interface 500, the group-based communication channel identifier 804 indicating the group-based communication channel (#revitalizationpjt) 805 that is being displayed. Within the group-based communication channel 805, the name of the member 806 associated with the third party email communication account from which the third party email communication corpus entered the group-based communication system is listed as well as a latency indicator 808 to indicate the time when the message communication 816 was created in the group-based communication channel 805. The latency indicator 808 could also or instead indicate the time when the third party electronic communication corpus 401 was originally sent or received. In the embodiment illustrated in FIG. 9, a profile identifier 810 of the third party email communication corpus 401 from which the group-based communication channel 805 was created is also displayed. The body 408 of the third party email communication corpus 401 is also included as well as the subject line 406 of the third party email communication corpus 401. The message communication 816 may include a variety of information from the third party communication corpus 401 as discussed above and oriented within the group-based communication channel 805 as desired in the group-based communication interface 500.

In the embodiment of FIG. 9, the group-based communication channel 805 also includes a channel communication input register 812 and a channel messaging actuator 814. The channel communication input register 812 is configured to receive group-based messaging communications from a member to be displayed in the selected group-based communication channel. The channel messaging actuator 814 (e.g., a button) can be selected by a member and initiates transmission of the group-based messaging communication inserted into the channel communication input register 812 to the circuitry 200 for processing. The group-based messaging communication is then displayed in the group-based communication channel 805. Accordingly, discussions regarding the third party email communication corpus 401 may continue in the group-based communication interface 500.

The group-based communication channel 805 may include other identifying information for the group-based communication channel (e.g., date of creation, time of last messaging communication, members of communication channel, etc.).

FIG. 10 illustrates an exemplary creation of a group-based communication channel identifier according to one embodiment of the present disclosure. In the embodiment illustrated in FIG. 10, a group-based communication channel identifier 804 is created. In some embodiments, the group-based communication channel identifier 804 may be generated in response to the receipt of a third party email communication corpus 401 and a group-based communication interface invitation request (e.g., see FIG. 9), while in some embodiments, the group-based communication channel identifier 804 may be created by a member of the group-based communication interface 500. As shown in FIG. 10, in this embodiment, the group-based communication channel identifier 804 is #revitalizationofbarrystreet and was created by a member of the group-based communication interface 500. The embodiment illustrated in FIG. 10 also includes new channel instructions 702.

In some embodiments, a third party email communication corpus 401 may be created in the group-based communication interface 500. FIG. 11 illustrates an exemplary creation of a third party email communication corpus 410 in the group-based communication interface 500 according to one embodiment of the present disclosure. In the embodiment illustrated in FIG. 11, the group-based communication interface 500 includes the name of the particular member 801 ("Mike Smith") viewing the group-based communication interface 500, a group-based communication channel identifier 804, and a third party email communication corpus 401 created in the group-based communication interface 500. The body 408 of the third party email communication corpus 401 is displayed as well as the subject line 406 of the third party email communication corpus 401 and the recipient third party email communication account identifiers 418. In the embodiment illustrated in FIG. 11, the third party email communication corpus 401 has not been transmitted to the recipient third party email communication accounts associated with the recipient third party email communication account identifiers 418, thus, no latency indicators are displayed 808.

In some embodiments, the group-based communication system 105 may analyze the third party email communication corpus 401 when created in the group-based communication interface 500 for potential new members as discussed above (e.g., parsing to identify third party email communication account identifiers, comparing such identifiers to identifiers already associated with the group-based communication interface, identifying identifiers not already associated with the group-based communication interface) and then generate group-based communication interface invitation requests 1200 in response. In some embodiments, the third party email communication corpus 401 may be forwarded within the group-based communication interface 500 to the group-based communication interface account.

FIG. 12 illustrates an exemplary group-based communication interface 500 forwarding a third party email communication corpus 401 to a group-based communication interface account according to one embodiment of the present disclosure. In the embodiment illustrated in FIG. 12, the group-based communication interface 500 includes the name of the particular member 801 ("Mike Smith") viewing the group-based communication interface 500, a group-based communication channel identifier 804, and a third party email communication corpus 401 created in the group-based communication interface 500. The body 408 of the third party email communication corpus 401 is displayed as well as the subject line 406 of the third party email communication corpus 401, the recipient third party email communication account identifiers 418, and the source third party email communication account identifier 404. In the embodiment illustrated in FIG. 12, the third party email communication corpus 401 has been transmitted to the recipient third party email communication accounts associated with the recipient third party email communication account identifiers 418, thus, the latency indicators are displayed 808.

A group-based communication interface invitation request 1200 as discussed with regards to FIG. 7 may then be generated, leading to the generation and transmission of a group-based communication interface invitation 904 as discussed with regards to FIG. 8 and the generation and display of a group-based communication channel 805 as discussed with regards to FIG. 9.

In some embodiments, the group-based communication system 105 may request to access third party email communication accounts to search for potential new members. FIG. 13 illustrates a request to access a third party email communication account according to one embodiment of the present disclosure. In particular, FIG. 13 illustrates the group-based communication interface 500 displaying a request to access a third party email communication account 1300. The request to access a third party email communication account 1300 includes request to access instructions 1302 and access approve/disapprove actuators 1303. By selecting the access approve/disapprove actuators 1303 a member may allow or not allow, respectively, the group-based communication system 105 to search their third party email communication account for potential new members as discussed above (e.g., parsing to identify third party email communication account identifiers, comparing such identifiers to identifiers already associated with the group-based communication interface, identifying identifiers not already associated with the group-based communication interface) and then generate group-based communication interface invitation requests 1200 in response.

In some embodiments, the group-based communication system 105 may search the history of the third party email communication corpus 401 for potential new members. FIG. 14 illustrate an exemplary group-based communication interface 500 according to embodiments of the present disclosure. In particular, in the embodiment illustrated in FIG. 14, the group-based communication interface 500 includes the name of the particular member 801 ("Mike Smith") viewing the group-based communication interface 500, a group-based communication channel identifier 804, and a third party email communication corpus 401 (parts 401a and 401b) created in the group-based communication interface 500. As the third party email communication corpus 401 is transmitted to recipient third party email communication accounts and content is added to the third party email communication corpus, the group-based communication system 105 may continue to analyze each iteration of the third party email communication corpus 401. For instance, the third party email communication corpus 401 may have bodies of the communication 408a, 408b displayed as well as the subject lines 406a, 406b of the third party email communication corpus 401a, 401b, the recipient third party email communication account identifiers 418a, 418b, the source third party email communication account identifier 404a, 404b, and latency indicators 808a, 808b for each iteration of the third party email communication corpus 401a, 401b. The group-based communication system 105 may recognize potential new members in all of the listed third party email communication account identifiers (e.g., recipient third party email communication account identifiers 418a, 418b and the source third party email communication account identifier 404a, 404b), such as the third party email communication account identifier "Sam.Love@corp.com" in third party email communication corpus 401b and "Will.Green@corp.com" in third party email communication corpus 401a. Group-based communication interface invitation requests 1200 may be generated in response.

FIG. 15 is a flowchart illustrating operations that are executed by an exemplary group-based communication system for onboarding according to one embodiment of the present disclosure. In the embodiment illustrated in FIG. 15, the flowchart illustrates method 1500 which includes receiving a third party email communication corpus 1501, analyzing the third party email communication corpus including one or more third party email communication account identifiers 1502, and generating and transmitting a group-based communication interface invitation to the third party email communication account associated with the at least one of the one or more third party email communication account identifier 1504. In particular embodiments, the method 1500 includes copying at least one of the one or more email communication account identifiers 1503. In some embodiments, the method 1500 may also include storing the one or more third party email communication account identifiers in a set of third party email communication account identifier 1506 associated with the group-based communication interface.

In some embodiments, analyzing the third party email communication corpus 1502 may include comparing the one or more third party email communication account identifiers to a set of third party email communication account identifier 1512 associated with the group-based communication interface. In some embodiments that include copying at least one of the one or more third party email communication account identifiers 1503, particular embodiments may include copying one or more third party email communication account identifiers not listed in the set of third party email communication account identifiers associated with the group-based communication interface 1514.

In some embodiments, the method 1500 may include generating and displaying a group-based communication interface invitation request 1516 and receiving approval for a group-based communication interface invitation 1518 prior to generating and transmitting a group-based communication interface invitation to the third party email communication account associated with the at least one of the one or more third party email communication account identifiers 1504.

In some embodiments, the method 1500 may include generating a group-based communication channel 1520 as discussed herein when generating and transmitting a group-based communication interface invitation.

FIG. 16 is a flowchart illustrating operations that are executed by an exemplary group-based communication system for onboarding according to one embodiment of the present disclosure. In the embodiment illustrated in FIG. 16, the flowchart illustrates method 1600 which includes receiving a group-based communication interface request 1601 and generating and displaying a group-based communication interface identifier 1602. The method 1600 may be incorporated into the method 1500 prior to or after receiving a third party email communication corpus 1501.

FIG. 17 is a flowchart illustrating operations that are executed by an exemplary group-based communication system for onboarding according to one embodiment of the present disclosure. In some embodiments, the method 1700 may include generating and displaying a group-based communication channel identifier 1702. In some embodiments, generating and displaying a group-based communication channel identifier 1702 may include translating the content of the third party email communication corpus into a group-based communication channel identifier based on established conventions of the group-based communication interface 1704. The method 1700 may be incorporated into the method 1500 prior to or after receiving a third party email communication corpus 1501.

FIG. 18 illustrates is a flowchart illustrating operations that are executed by an exemplary group-based communication system for onboarding according to one embodiment of the present disclosure. In particular, FIG. 18 illustrates method 1800 which includes transmitting a request to access a third party email communication account 1801, receiving an approval to access the third party email communication account 1802, and analyzing a plurality of third party email communication corpus of the third party email communication account 1803. Once authenticated to a member's third party email communication account (e.g., via OAuth or the like), the group-based communication system may then be able to pull historical as well as all new third party email communication corpus from the third party email communication account into the group-based communication system for that user. The group-based communication system may receive a third party email communication corpus or a plurality of third party email communication corpus and then analyze the third party email communication corpus. The third party email communication corpus(a) may be stored locally within the group-based communication system and may become the basis by which the potential new members (e.g., group-based communication interface invitation requests) and group-based communication channel recommendations are made. The method 1800 may continue as discussed in method 1500 with analyzing the third party email communication corpus including one or more third party email communication account identifiers 1502 and generating and transmitting a group-based communication interface invitation to the third party email communication account associated with the at least one of the one or more third party email communication account identifiers 1504 and other operations as discussed above with regards to FIG. 15.

FIG. 19 illustrates is a flowchart illustrating operations that are executed by an exemplary group-based communication system for onboarding according to one embodiment of the present disclosure. In particular, FIG. 19 illustrates a method 1900 which includes generating a third party email communication corpus 1901 and transmitting the third party email communication corpus to a group-based communication system 1902. The method 1900 may also include receiving a group-based communication interface invitation request 1903 and transmitting an approval of the group-based communication interface invitation 1904. The method 1900 may also include any of the operations discussed with regards to FIG. 15-18.

FIG. 20 illustrates is a flowchart illustrating operations that are executed by an exemplary group-based communication system for onboarding according to one embodiment of the present disclosure. In particular, FIG. 20 illustrates a method 2000 which includes generating a group-based communication interface request 2001 and receiving a group-based communication interface identifier 2002. The method 2000 may also include any of the operations discussed with regards to FIG. 15-19.

FIG. 21 illustrates is a flowchart illustrating operations that are executed by an exemplary group-based communication system for onboarding according to one embodiment of the present disclosure. In particular, FIG. 21 illustrates a method 2100 which includes receiving a request to access the third party email communication account 2101, transmitting an approval to access the third party email communication account 2102, and transmitting a plurality of third party email communication corpuses of the third party email communication account 2103. The method 2100 may also include any of the operations discussed with regards to FIG. 15-20.

FIG. 22 illustrates is a flowchart illustrating operations that are executed by an exemplary group-based communication system for onboarding according to one embodiment of the present disclosure. In particular, FIG. 22 illustrates a method 2200 which includes receiving a group-based communication interface invitation 2201, transmitting a group-based communication interface access request to a group-based communication system 2202, and displaying the group-based communication interface 2203. The method 2200 may also include any of the operations discussed with regards to FIG. 15-21.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus configured to execute an email communication import protocol in a selected group-based communication interface, the apparatus comprising at least a processor, and a memory associated with the processor having computer coded instructions therein, with the computer coded instructions configured to, when executed by the processor, cause the apparatus to:
   receive an email communication corpus, the email communication corpus comprising one or more external email communication account identifiers, each of the one or more external email communication account identifiers being associated with respective email communication accounts external to the group-based communication interface;
   parse the email communication corpus to identify the one or more external email communication account identifiers;
   generate for display, within the group-based communication interface, an actuator to create a group-based communication interface invitation;
   generate and transmit the group-based communication interface invitation to the email communication accounts associated with the at least one of the one or more external email communication account identifiers based at least in part on the actuator,
   wherein the group-based communication interface invitation comprises a user engageable link to access the group-based communication interface; and
   in response to receiving a user actuation of the user engageable link from within an external email interface, adding a user corresponding to an external email communication account identifier of the one or more external email communication account identifiers to a group-based communication channel of the group-based communication interface.

2. The apparatus according to claim 1, wherein the computer coded instructions are configured to, when executed by the processor, further cause the apparatus to:
   receive a group-based communication interface request; and
   in response to receiving a group-based communication interface request, generate and display a group-based communication interface identifier, wherein receipt of the group-based communication interface request occurs prior to or in response to receipt and analysis of the email communication corpus.

3. The apparatus of claim 1, wherein the email communication corpus includes a group-based communication interface identifier.

4. The apparatus of claim 1, wherein the user engageable link is configured to allow access to a group-based communication channel of the group-based communication interface.

5. The apparatus of claim 4, wherein the group-based communication channel of the group-based communication interface includes a messaging communication derived from content of the email communication corpus.

6. The apparatus of claim 1, wherein the computer coded instructions are configured to, when executed by the processor, further cause the apparatus to generate and display a group-based communication channel identifier based on a content of the email communication corpus prior to or in response to receipt or analysis of the email communication corpus.

7. The apparatus of claim 6, wherein the content of the email communication corpus comprises a subject line of the email communication corpus, a body of the email communication corpus, one or more email communication account identifiers associated with the email communication corpus, or a combination thereof.

8. The apparatus of claim 6, wherein generating the group-based communication channel identifier comprises translating the content of the email communication corpus into the group-based communication channel identifier based on established conventions of the group-based communication interface.

9. The apparatus of claim 1, wherein the computer coded instructions are configured to, when executed by the processor, compare the one or more email communication account identifiers to a set of email communication account identifiers associated with the group-based communication interface when analyzing the email communication corpus including the one or more email communication account identifiers.

10. The apparatus of claim 1, wherein the computer coded instructions are configured to, when executed by the processor, further cause the apparatus to:
transmit a request to access the email communication account,
receive an approval to access the email communication account, and
in response to receiving the approval to access the email communication account, receive the email communication corpus.

11. The apparatus of claim 1, wherein when the apparatus receives the email communication corpus, the respective email communication accounts external to the group-based communication interface are also in receipt of the email communication corpus.

12. A method to execute an email communication import protocol in a selected group-based communication interface, the selected group-based communication interface organizing a collection of messaging communications into a plurality of group-based communication channels, the method comprising:
receiving an email communication corpus, the email communication corpus comprising one or more external email communication account identifiers, each of the one or more external email communication account identifiers being associated with respective email communication accounts external to the group-based communication interface,
parsing the email communication corpus to identify the one or more external email communication account identifiers,
generating, for display within the group-based communication interface, an actuator to create a group-based communication interface invitation,
generating and transmitting a group-based communication interface invitation to the email communication account associated with at least one of the one or more external email communication account identifiers based at least in part on the actuator,
wherein the group-based communication interface invitation comprises a user engageable link to access the group-based communication interface, and
in response to receiving a user actuation of the user engageable link from within an external email interface, adding a user corresponding to an external email communication account identifier of the one or more external email communication account identifiers to a group-based communication channel of the group-based communication interface.

13. The method of claim 12, comprising:
receiving a group-based communication interface request; and
in response to receiving a group-based communication interface request, generating and displaying a group-based communication interface identifier, wherein receipt of the group-based communication interface request occurs prior to or in response to receipt and analysis of the email communication corpus.

14. The method of claim 12, wherein the email communication corpus includes a group-based communication interface identifier.

15. The method of claim 12, wherein the user engageable link is configured to allow access to a group-based communication channel of the group-based communication interface.

16. The method of claim 12, wherein the group-based communication channel of the group-based communication interface includes a messaging communication derived from content of the email communication corpus.

17. The method of claim 12, further comprising generating and displaying a group-based communication channel identifier based on a content of the email communication corpus prior to or in response to receipt or analysis of the email communication corpus.

18. The method of claim 17, wherein the content of the email communication corpus comprises a subject line of the email communication corpus, a body of the email communication corpus, one or more email communication account identifiers associated with the email communication corpus, or a combination thereof.

19. The method of claim 17, wherein generating the group-based communication channel identifier comprises translating the content of the email communication corpus into a group-based communication channel identifier based on established conventions of the group-based communication interface.

20. The method of claim 12, comprising comparing the one or more email communication account identifiers to a set of email communication account identifiers associated with the group-based communication interface when analyzing the email communication corpus including the one or more email communication account identifiers.

21. The method of claim 20, further comprising copying at least one of the one or more email communication account identifiers.

22. The method of claim 21, comprising copying the one or more email communication account identifiers not listed in the set of email communication account identifiers associated with the group-based communication interface when copying at least one of the one or more email communication account identifiers.

23. The method of claim 12, further comprising storing the one or more email communication account identifiers in a set of email communication account identifiers associated with the group-based communication interface.

24. The method of claim 12, further comprising:
transmitting a request to access the email communication account, receiving an approval to access the email communication account, and in response to receiving the approval to access the email communication account, receiving the email communication corpus.

25. An apparatus configured to execute an email communication import protocol in a selected group-based communication interface, the apparatus comprising at least a processor, and a memory associated with the processor having computer coded instructions therein, with the computer coded instructions configured to, when executed by the processor, cause the apparatus to:

generate an email communication corpus, the email communication corpus comprising one or more external email communication account identifiers, each of the one or more external email communication account identifiers being associated with respective email communication accounts external to the group-based communication interface, and transmit the email communication corpus to a group-based communication system comprising the group-based communication interface, wherein transmission of the email communication corpus to the group-based communication system causes a group-based communication interface invitation to be transmitted to at least one email communication account associated with at least one of the one or more external email communication account identifiers of the email communication corpus based at least in part on an actuator of the group-based communication interface for creating the group-based communication interface invitation, and wherein the group-based communication interface invitation comprises a user engageable link to access the group-based communication interface, and in response to receiving a user actuation of the user engageable link from within an external email interface, adding a user corresponding to an external email communication account identifier of the one or more external email communication account identifiers to a group-based communication channel of the group-based communication interface.

26. The apparatus according to claim 25, wherein the computer coded instructions are configured to, when executed by the processor, further cause the apparatus to:

generate a group-based communication interface request; and in response to generating a group-based communication interface request, receive a group-based communication interface identifier, wherein receipt of the group-based communication interface request occurs prior to or in response to generation of the email communication corpus.

27. The apparatus of claim 25, wherein when transmitting the email communication corpus to a group-based communication system comprising the group-based communication interface, the email communication corpus includes a group-based communication interface identifier.

28. The apparatus of claim 25, wherein the computer coded instructions are configured to, when executed by the processor, further cause the apparatus to:

receive a group-based communication interface invitation request, and transmit an approval of the group-based communication interface invitation request prior to transmission of the group-based communication interface invitation to be transmitted to at least one email communication account associated with at least one of the one or more email communication account identifiers of the email communication corpus.

29. The apparatus of claim 25, wherein the user engageable link is configured to allow access to a group-based communication channel of the group-based communication interface and wherein the group-based communication channel of the group-based communication interface includes a messaging communication derived from content of the email communication corpus.

30. The apparatus of claim 29, wherein the computer coded instructions are configured to, when executed by the processor, further cause the apparatus to generate and display a group-based communication channel identifier based on a content of the email communication corpus.

31. The apparatus of claim 29, wherein the content of the email communication corpus comprises a subject line of the email communication corpus, a body of the email communication corpus, one or more email communication account identifiers associated with the email communication corpus, or a combination thereof.

32. The apparatus of claim 30, wherein generating the group-based communication channel identifier comprises translating the content of the email communication corpus into a group-based communication channel identifier based on established conventions of the group-based communication interface.

33. The apparatus of claim 25, wherein the computer coded instructions are configured to, when executed by the processor, further cause the apparatus to:

receive a request to access the email communication account, transmit an approval to access the email communication account, and in response to transmitting the approval to access the email communication account, transmit the email communication corpus.

* * * * *